US012231590B2

(12) United States Patent
Fortuna et al.

(10) Patent No.: US 12,231,590 B2
(45) Date of Patent: Feb. 18, 2025

(54) METHOD AND APPARATUS FOR USING CRYPTOCURRENCY GIFT CARDS

(71) Applicant: The Everest Project LLC, Youngstown, OH (US)

(72) Inventors: Justin Fortuna, Poland, OH (US); Michael Owens, Canfield, OH (US); Allen C. Conti, Canfield, OH (US)

(73) Assignee: THE EVEREST PROJECT LLC, Youngstown, OH (US)

( * ) Notice: Subject to any disclaimer, the term of this patent is extended or adjusted under 35 U.S.C. 154(b) by 99 days.

(21) Appl. No.: 18/313,763

(22) Filed: May 8, 2023

(65) Prior Publication Data
US 2024/0104522 A1     Mar. 28, 2024

Related U.S. Application Data

(60) Provisional application No. 63/376,698, filed on Sep. 22, 2022.

(51) Int. Cl.
| | | |
|---|---|---|
| *G06Q 40/00* | (2023.01) | |
| *G06F 21/10* | (2013.01) | |
| *G06Q 20/02* | (2012.01) | |
| *G06Q 20/06* | (2012.01) | |
| *G06Q 20/34* | (2012.01) | |

(Continued)

(52) U.S. Cl.
CPC .............. *H04L 9/50* (2022.05); *G06F 21/105* (2013.01); *G06Q 20/02* (2013.01); *G06Q 20/065* (2013.01); *G06Q 20/342* (2013.01); *G06Q 20/36* (2013.01); *G06Q 20/3672* (2013.01); *G06Q 20/3674* (2013.01); *G06Q 20/3829* (2013.01);

(Continued)

(58) Field of Classification Search
CPC .......................... G06Q 20/065; G06Q 20/342
See application file for complete search history.

(56) References Cited

U.S. PATENT DOCUMENTS

| | | |
|---|---|---|
| 2018/0191503 A1 | 7/2018 | Alwar et al. |
| 2018/0351921 A1 | 12/2018 | Sharifi Mehr |

(Continued)

FOREIGN PATENT DOCUMENTS

| | | |
|---|---|---|
| CN | 108038678 | 5/2018 |
| KR | 20190045753 | 3/2019 |

(Continued)

OTHER PUBLICATIONS

Lingen, Frank (Cryptocurrencies and the Gift Card Threshold, https://www.linkedin.com/pulse/cryptocurrencies-gift-card-threshold-frank-van-lingen/ Jul. 2019) (Year: 2019).*

(Continued)

*Primary Examiner* — Elizabeth H Rosen
*Assistant Examiner* — Mark H Gaw
(74) *Attorney, Agent, or Firm* — Sand, Sebolt & Wernow Co., LPA

(57) ABSTRACT

Methods and processes for faster and more efficient creation of NFTs while further enhancing the use and transferability of digital assets along with, or in conjunction with, tangible goods and other physical real world assets; methods for securing personal keys that allow for improved security of the physical key while simultaneously providing for transferability of the underlying digital assets; and methods for creation and activation of digital wallets, digital assets, and/or digital asset backed gift cards and the like.

10 Claims, 13 Drawing Sheets

(51) Int. Cl.
  *G06Q 20/36* (2012.01)
  *G06Q 20/38* (2012.01)
  *G06Q 30/06* (2023.01)
  *H04L 9/00* (2022.01)
  *H04L 9/08* (2006.01)
  *H04L 9/32* (2006.01)

(52) U.S. Cl.
  CPC ........... *G06Q 30/06* (2013.01); *H04L 9/0897* (2013.01); *H04L 9/3213* (2013.01)

(56) References Cited

U.S. PATENT DOCUMENTS

| | | |
|---|---|---|
| 2020/0005282 A1 | 1/2020 | Kim |
| 2020/0162246 A1 | 5/2020 | Schouppe |
| 2022/0058636 A1 | 2/2022 | Yantis |
| 2022/0210061 A1 | 6/2022 | Simu |
| 2022/0229883 A1 | 7/2022 | Khandelwal et al. |
| 2022/0253958 A1 | 8/2022 | Grobecker et al. |
| 2023/0298005 A1* | 9/2023 | Saad ............... G06Q 20/4016 705/65 |
| 2023/0308427 A1* | 9/2023 | Mattison ............... H04L 63/08 |
| 2023/0401571 A1* | 12/2023 | Lee ............... G06Q 20/12 |
| 2024/0020683 A1* | 1/2024 | Bacon ............... G06Q 20/3674 |
| 2024/0037593 A1* | 2/2024 | Navon ............... G06Q 20/389 |

FOREIGN PATENT DOCUMENTS

| | | |
|---|---|---|
| KR | 20190099984 | 8/2019 |
| WO | 2022178096 | 8/2022 |

OTHER PUBLICATIONS

Striegel. Wallet Security Explained. Dec. 3, 2018 (Mar. 12, 2018) [retrieved on Nov. 10, 2023]. Retrieved from the internet <URL: https:/lblog.venly.io/wallet-security-explained-5b540d746583> entire document.

Martino. NFTs and Intellectual Property. May 17, 2021 (May 17, 2021) [retrieved on Nov. 10, 2023]. Retrieved from the internet <URL: https://www.mofo.com/resources/podcasts/210430-nfts-and-intellectual-property> entire document.

PCT International Search Report (Dec. 20, 2023). PCT/US2023/074726.

Martin et al., "A Technical Deep Dive Into and Implementation of Non-Fungible Tokens in a Practical Setting," Dec. 2021. Retrieved on May 12, 2023. Retrieved from <URL:https://timroughgarden.github.io/fob21/reports/r8.pdf> entire document.

International Search Report, PCT/US2023/074738. Feb. 9, 2024.

\* cited by examiner

METHOD AND APPARATUS FOR USING CRYPTOCURRENCY GIFT CARDS

CROSS REFERENCE TO RELATED APPLICATIONS

This application claims the benefit of U.S. Provisional Application Ser. No. 63/376,698, filed on Sep. 22, 2022; the disclosure of which is incorporated herein by reference.

TECHNICAL FIELD

The present disclosure relates generally to the field of blockchain and non-fungible token (NFT) based digital assets. More particularly, in one example, the present disclosure relates to methods and apparatus for controlling title to a physical asset utilizing a combination of NFT, blockchain, and real world transactions. Specifically, in one example, the present disclosure relates to controlling the physical title and physical ownership of a tangible object utilizing NFT and blockchain based transactions to further support and facilitate the ownership exchange and physical handling of the item. Further, in one example, the present disclosure relates to methods and processes for creating and managing digital assets, digital wallets, and digital tokens.

BACKGROUND

Digital assets, such as cryptocurrency, NFT, and other tokens, are becoming more mainstream and commonplace as the relevant technology evolves. With the advent of Web3 and the Metaverse, decentralized ownership and shared control are becoming even more prevalent and important in the world's economy. Additionally, governments around the world have begun adopting digital currency supported by their own central banks, including the U.S., which recently released a framework for regulation of digital assets supported by the U.S. central bank.

The technology supporting and providing for the creation and utilization of digital assets is known as a blockchain technology. Blockchains, or blockchain platforms, are methods of securely recording information on a peer-to-peer network that is hosted in a shared public database (i.e. the network is decentralized). This shared public database may be duplicated across many computer systems, which may allow for new entries to be added to the blockchain while simultaneously preventing the alteration of existing entries on the blockchain.

Each of these blockchain entries, called blocks, are generated via specific protocols that vary for each existing blockchain. Each block in the blockchain may contain new information representing the data added to the chain while simultaneously presenting encoded information about the previous block. This inclusion of information regarding the previous block serves to reinforce the order and structure of the blockchain as it grows.

There are currently over one thousand existing blockchains with more coming online. Typically, there are four main types of blockchains, namely, consortium chains, where several companies make up a consortium to create a blockchain network; public blockchain networks; private blockchain nets; and hybrid networks, which can be a hybrid of public and private or public and consortium networks. The types of blockchain networks are typically determined by who controls the specific blockchain. In particular, consortium blockchain networks are controlled by the aforementioned group, private blockchain networks are controlled by a singular authority, public blockchain networks have no central authority, and hybrid networks are typically controlled by a permissionless process.

Public blockchains are completely decentralized in that they are open to anyone and do not have restrictions on who can participate in the network. Typically, all that is required is a stable internet connection and a computer with sufficient hardware and anyone can participate in the public blockchain to hold copies of blocks or nodes in the network as well as to perform verification of transactions or records. Disadvantages to utilizing the public blockchains in minting new digital assets, as discussed further herein, include that the processing time is very slow due to the large size of the public chain, verification of each node is a time consuming process. Additionally, performing proof of work tasks on the public blockchain is energy consuming and may require specialized hardware. Finally, not all public blockchains, and the digital assets associated therewith, are accepted universally; therefore, implementation of the public blockchain technology tends to be slower and less widespread initially.

Public blockchains typically utilize smart contracts, which enable the blockchain to support decentralization. Some specific examples of well-known public blockchains include Bitcoin and Ethereum. Others can include NEO, Solana, Waves, Stellar, and Multichain, to name a few.

Each of these blockchains have individual features, advantages, and/or disadvantages that may vary depending upon the desired use.

Digital assets are supported by these blockchains in that a digital asset is created, or minted, by adding new information to a particular blockchain. Through these entries, users can mint new digital assets and further can exchange or transfer existing digital assets as desired.

One type of digital asset that is becoming increasingly popular is the non-fungible token (NFT), which is a token that represents ownership of a unique digital item. The NFT, having been minted to the blockchain, is immutable in that once the data is attached to the chain, it cannot be amended or changed. Accordingly, the NFT can function to certify that the holder owns the underlying digital asset and can sell, trade, and/or redeem it. NFTs are finding increased interest in relation to other digital assets such as art, including digital images and video clips, IDs, and the like.

When the owner of an NFT wishes to sell, trade, and/or redeem the token, the NFT itself may serve as a verification of the ownership and right to sell, as well as be an asset to be transferred. Upon transfer, a new block may be minted memorializing the transfer itself and terms thereof while maintaining and linking the prior ownership records and prior blocks on the blockchain containing information regarding the NFT.

The NFT may further include or provide a smart contract, which may be stored as part of the NFT block or alternatively may be stored in a separate block; however, the smart contract may define the rights and permissions of the NFT and the transfer thereof.

Because the NFT is able to be linked to prior blocks on the blockchain, the NFT may further include information linking to all prior transactions as well as transfers, ownership interests and the like, thus effectively creating a digital chain of title for the digital asset underlying the NFT.

Digital assets, while stored and recorded on the blockchain ledger where they were issued (in most cases), have a public and private key associated with the asset, thus allowing someone to have exclusive access to the assets they own. The private key, which functions essentially as a private password, may be stored in a digital wallet or other similar digital structure that may be unique to the owner and therefore may allow access to the digital asset on the blockchain. Wallets may be stored online in the cloud or may be stored privately, such as on a secured private network or even on removable media such as a flash drive or the like. If the private key is lost, access to the underlying digital asset, such as the NFT, may likewise be lost despite its existence on the blockchain. This is a protection put in place to prevent others from accessing individual blocks on the chain without permission, thus further protecting and securing the assets carried on a particular chain.

Typically, wallets are stored in full in a single location such as on, or in a "cold wallet", which may be a physical storage device such as a data card, flash drive, or the like, or alternatively stored in an application or cloud-based service. These digital keys that are stored in the cloud or with an application are only as secure as the access to the application and/or cloud service. Put another way, by way of one example, a personal key stored in a cloud-based wallet that is accessible through an application on a smartphone, may be obtained if someone has access to that physical device, i.e. the smartphone. Similarly, cold storage, or cold wallets, may be obtained by anyone with physical access to the cold wallet device. For example, a cold wallet stored on a flash drive may be accessed by anyone in possession of the flash drive. Thus, one of the least secure or most vulnerable part of owning digital assets is the individual user's level of effort in protecting their private key and/or cold wallets.

Generally speaking, digital assets, including NFTs, may be redeemed, sold, or transferred for any purpose as long as the recipient agrees to the value of the digital asset. Most digital assets are not backed by physical currency, tangible items, or real world assets but instead are linked to digital assets such as artwork, video clips, cryptocurrency, or the like. In the unusual circumstance where a digital asset, such as an NFT, is linked to a tangible good or to other real world assets such as stocks or bonds, the NFT tends to function solely to provide a chain of title that may be recorded on the blockchain for security and longevity purposes.

As mentioned above, typical minting processes utilize one or more smart contracts to govern the minted token and the data contained on the associated block. Alternatively, current minting processes may utilize terminal commands to establish the NFT and/or data block that may be added to the blockchain.

SUMMARY

The present disclosure addresses technical issues in the minting and creation of non-fungible tokens (NFT). The presently described processes may provide faster and more efficient creation of NFTs while further enhancing the use and transferability of digital assets along with, or in conjunction with, tangible goods and other physical real world assets. Further provided are methods for securing personal keys that allow for improved security of the physical key while simultaneously providing for transferability of the underlying digital assets. Additionally, methods and processes for creation and activation of digital wallets, digital assets, and/or digital asset backed gift cards and the like are provided.

Accordingly, the present disclosure addresses issues with current digital asset technology by providing one or more methods to improve NFT and blockchain transactions while allowing enhanced control, security, and transferability of NFT digital assets along with underlying physical assets.

In one aspect, an exemplary embodiment of the present disclosure may provide a method of minting non-fungible tokens comprising: generating a non-fungible token (NFT) minting request from an activation programming interface (API) request queue; sending the NFT minting request directly to a dedicated minter; minting at least one NFT responsive to the NFT minting request to a house wallet controlled by the minter; generating an API response indicating one of a successful minting event and a failed minting event; and displaying the response to a user. This exemplary embodiment or another exemplary embodiment may further provide transferring the at least one NFT from the house wallet to a digital wallet controlled by the user when the API response indicates a successful minting event. This exemplary embodiment or another exemplary embodiment may further provide minting the digital wallet controlled by the user; creating a digital wallet key; encrypting a first part of the digital wallet key with a first cipher; encrypting a second part of the digital wallet key with a second cipher; storing the first part of the digital wallet key in a minter database on a network separate from the minter; transferring the second part of the digital wallet key to the digital wallet; generating at least one wallet retrieval phrase; encrypting the at least one wallet retrieval phrase with the first cipher; and storing the at least one wallet retrieval phrase in the minter database. This exemplary embodiment or another exemplary embodiment may further provide encrypting a third part of the digital wallet key with the second cipher; and storing the third part of the digital wallet key in a native application separate from the digital wallet. This exemplary embodiment or another exemplary embodiment may further provide wherein the first cipher further comprises: an activation programming interface (API) cipher. This exemplary embodiment or another exemplary embodiment may further provide wherein the second cipher further comprises: a server cipher. This exemplary embodiment or another exemplary embodiment may further provide wherein the NFT minting request further comprises: an API index identifier; a receiving wallet index identifier; a user index identifier; a receiving wallet public key; and the NFT creation information file. This exemplary embodiment or another exemplary embodiment may further provide wherein minting the at least one NFT further comprises: minting the at least one NFT on a commercial blockchain. This exemplary embodiment or another exemplary embodiment may further provide wherein minting the at least one NFT further comprises: a smart contract. This exemplary embodiment or another exemplary embodiment may further provide wherein minting the at least one NFT further comprises: at least one terminal command. This exemplary embodiment or another exemplary embodiment may further provide wherein minting the at least one NFT further comprises: a combination of at least smart contract and at least one terminal command. This exemplary embodiment or another exemplary embodiment may further provide wherein the at least one NFT further comprises: an image of a tangible item. This exemplary embodiment or another exemplary embodiment may further provide wherein the at least one NFT further comprises: one of a photograph, video, 3D image, and a drawing. This exemplary embodiment or another exemplary embodiment may further provide wherein minting the at least one NFT further comprises: minting a first NFT containing the image of the tangible item; and minting a second NFT containing a digital deed to the tangible item. This exemplary embodiment or another exemplary embodiment may further provide transferring the first NFT and the second NFT from the house wallet to a digital wallet controlled by the user when the API response indicates a successful minting event. This exemplary embodiment or another exemplary embodiment may further provide wherein transferring the first NFT and the second NFT further comprises: transferring the deed to the tangible item; and transferring ownership of tangible item along with the deed. This exemplary embodiment or another exemplary embodiment may further provide delivering physical possession of the tangible item to the user. This exemplary embodiment or another exemplary embodiment may further provide storing the tangible item on behalf of the user.

In another aspect, an exemplary embodiment of the present disclosure may provide a method of exiting a blockchain comprising: receiving an exit request containing a security token; initiating an authentication queue; requesting authentication information to confirm the wallet exit request from the user controlling the digital wallet for which the exit request was received; verifying the authentication information; retrieving the user's unique identifying information and wallet file data from the local network; matching the unique identifying information and wallet file data to the authentication information in the exit request; decrypting the wallet file data; and appending the decrypted wallet file data to the user's digital wallet. This exemplary embodiment or another exemplary embodiment may further provide terminating the exit request when the authentication information cannot be verified. This exemplary embodiment or another exemplary embodiment may further provide activating a user denial response handler simultaneously with requesting authentication information; and terminating the exit request if the user cancels the request. This exemplary embodiment or another exemplary embodiment may further provide deleting any archived pass phrase files and archived wallet file data from archived storage upon successful matching of the unique identifying information and wallet file data to the authentication information in the exit request. This exemplary embodiment or another exemplary embodiment may further provide generating a notification of a successful match; and generating a prompt for the user controlling the digital wallet for which the exit request was received to download the wallet data. This exemplary embodiment or another exemplary embodiment may further provide sending a wallet blockchain removal request to an activation programming interface (API) request queue; and removing the digital wallet from a stored wallet database. This exemplary embodiment or another exemplary embodiment may further provide wherein the user controlling the digital wallet for which the exit request was received maintains full ownership of the wallet and any assets contained therein upon successful download of the wallet data. This exemplary embodiment or another exemplary embodiment may further provide nullifying the decrypted wallet file data upon an unsuccessful match of the unique identifying information and wallet file data to the authentication information in the exit request. This exemplary embodiment or another exemplary embodiment may further provide generating a notification of an unsuccessful match; and terminating the exit request. This exemplary embodiment or another exemplary embodiment may further provide wherein decrypting the wallet file data further comprises: decrypting a first part of the wallet file data with a first cipher; and decrypting a second part of the wallet file data with a second cipher. This exemplary embodiment or another exemplary embodiment may further provide decrypting a third part of the wallet file data with the second cipher. This exemplary embodiment or another exemplary embodiment may further provide requesting the third part of the wallet file data to be uploaded from a device owned by the user controlling the digital wallet for which the exit request was received. This exemplary embodiment or another exemplary embodiment may further provide wherein the third part of the digital wallet file data is uploaded automatically upon initiation of the exit request by the user. This exemplary embodiment or another exemplary embodiment may further provide an activation programming interface (API) cipher that was used to encrypt the first part of the wallet file data and the third part of the wallet file data upon the wallet file data's original creation. This exemplary embodiment or another exemplary embodiment may further provide a server cipher that was used to encrypt the second part of the wallet file data upon the wallet file data's original creation.

In yet another aspect, an exemplary embodiment of the present disclosure may provide aa system comprising: at least smart device hosting a native application; at least one processor capable of executing logical functions in operable communication with the native application; and at least one non-transitory computer readable storage medium having instructions encoded thereon that, when executed by the processor, implements operations to generate an exit request containing a security token, the instructions including: initiate an authentication queue; request authentication information to confirm the wallet exit request from the user controlling the digital wallet for which the exit request was received; activate a user denial response handler simultaneously with requesting authentication information; verify the authentication information; retrieve the user's unique identifying information and wallet file data from the local network; match the unique identifying information and wallet file data to the authentication information in the exit request; decrypt the wallet file data; append the decrypted wallet file data to the user's digital wallet; and terminate the exit request upon receiving one of a user's cancelation of the exit request and a notification that the authentication information cannot be verified. This exemplary embodiment or another exemplary embodiment may further provide wherein the instructions further comprise: delete any archived pass phrase files and archived wallet file data from archived storage upon successful matching of the unique identifying information and wallet file data to the authentication information in the exit request. This exemplary embodiment or another exemplary embodiment may further provide wherein the instructions further comprise: generate a notification of a successful match; and generate a prompt for the user controlling the digital wallet for which the exit request was received to download the wallet data. This exemplary embodiment or another exemplary embodiment may further provide wherein the instructions further comprise: send a wallet blockchain removal request to an activation programming interface (API) request queue; and remove the digital wallet from a stored wallet database.

In yet another aspect, an exemplary embodiment of the present disclosure may provide a method of securing a blockchain key comprising: minting a digital wallet with a minter; creating a digital wallet key; encrypting a first part of the digital wallet key with a first cipher; encrypting a second part of the digital wallet key with a second cipher; storing the first part of the digital wallet key in a minter database on a network separate from the minter; transferring the second part of the digital wallet key to the digital wallet; generating at least one wallet retrieval phrase; encrypting the at least one wallet retrieval phrase with the first cipher; and storing the at least one wallet retrieval phrase in the minter database. This exemplary embodiment or another exemplary embodiment may further provide encrypting a third part of the digital wallet key with the second cipher; and storing the third part of the digital wallet key in a native application separate from the digital wallet. This exemplary embodiment or another exemplary embodiment may further provide wherein the first cipher further comprises: an activation programming interface (API) cipher. This exemplary embodiment or another exemplary embodiment may further provide wherein the second cipher further comprises: a server cipher. This exemplary embodiment or another exemplary embodiment may further provide generating an activation programming interface (API) response; and displaying the API response to an end user. This exemplary embodiment or another exemplary embodiment may further provide wherein the API response further comprises: an API index identifier; a unique identifier for file naming; a blockchain wallet public address; the second part of the digital wallet key; and the third part of the digital wallet key. This exemplary embodiment or another exemplary embodiment may further provide minting at least one non-fungible token (NFT) with the minter in response to an NFT minting request; and transferring the at least one NFT to the digital wallet. This exemplary embodiment or another exemplary embodiment may further provide confirming validity of the digital wallet key prior to minting the at least one NFT. This exemplary embodiment or another exemplary embodiment may further provide wherein confirming validity of at least one part of the digital wallet key further comprises: querying a microservices token database to confirm the digital wallet key. This exemplary embodiment or another exemplary embodiment may further provide prompting an owner of the digital wallet to complete a security process. This exemplary embodiment or another exemplary embodiment may further provide wherein the digital wallet key is only confirmed as valid when the user successfully completes the security process.

In yet another aspect, an exemplary embodiment of the present disclosure may provide a system comprising: at least smart device hosting a native application; at least one processor capable of executing logical functions in operable communication with the native application; and at least one non-transitory computer readable storage medium having instructions encoded thereon that, when executed by the processor, implements operations to secure a blockchain key, the instructions comprising: mint a digital wallet with a minter; create a digital wallet key; encrypt a first part of the digital wallet key with a first cipher; encrypt a second part of the digital wallet key with a second cipher; store the first part of the digital wallet key in a minter database on a network separate from the minter; transfer the second part of the digital wallet key to the digital wallet; generate at least one wallet retrieval phrase; encrypt the at least one wallet retrieval phrase with the first cipher; and store the at least one wallet retrieval phrase in the minter database. This exemplary embodiment or another exemplary embodiment may further provide wherein the instructions further comprise: encrypt a third part of the digital wallet key with the second cipher; and store the third part of the digital wallet key in a native application separate from the digital wallet. This exemplary embodiment or another exemplary embodiment may further provide wherein the first cipher further comprises: an activation programming interface (API) cipher. This exemplary embodiment or another exemplary embodiment may further provide wherein the second cipher further comprises: a server cipher. This exemplary embodiment or another exemplary embodiment may further provide wherein the instructions further comprise: generate an activation programming interface (API) response; and display the API response to an end user. This exemplary embodiment or another exemplary embodiment may further provide wherein the API response further comprises: an API index identifier; a unique identifier for file naming; a blockchain wallet public address; the second part of the digital wallet key; and the third part of the digital wallet key. This exemplary embodiment or another exemplary embodiment may further provide wherein the instructions further comprise: mint at least one non-fungible token (NFT) with the minter in response to an NFT minting request; transfer the at least one NFT to the digital wallet; and confirm validity of the digital wallet key prior to minting the at least one NFT. This exemplary embodiment or another exemplary embodiment may further provide wherein confirming validity of at least one part of the digital wallet key further comprises: querying a microservices token database to confirm the digital wallet key. This exemplary embodiment or another exemplary embodiment may further provide wherein the instructions further comprise: prompt an owner of the digital wallet to complete a security process; and confirm the digital wallet key as valid when the user successfully completes the security process.

In yet another aspect, an exemplary embodiment of the present disclosure may provide a method of using a cryptocurrency gift card comprising: purchasing a cryptocurrency gift card with a specified value at a retail point of purchase; downloading a native application to an associated smart device; activating the gift card via the native application; creating at least one non-fungible token (NFT) in response to activating the gift card; creating a digital wallet; linking the digital wallet to the gift card; and transferring the at least one NFT to the digital wallet. This exemplary embodiment or another exemplary embodiment may further provide generating at least one encrypted wallet key. This exemplary embodiment or another exemplary embodiment may further provide wherein creating at least one encrypted wallet key further comprises: dividing the key into a first part, a second part, and a third part; encrypting the first part of the key with a first cipher; and encrypting the second part and the third part of the key with a second cipher. This exemplary embodiment or another exemplary embodiment may further provide wherein the first cipher further comprises: an activation programming interface (API) cipher. This exemplary embodiment or another exemplary embodiment may further provide wherein the second cipher further comprises: a server cipher. This exemplary embodiment or another exemplary embodiment may further provide storing the first part of the key in a minter database; transferring the second part of the key to the digital wallet linked to the gift card; and storing the third part of the key in the native application. This exemplary embodiment or another exemplary embodiment may further provide wherein creating the at least one NFT further comprises: linking at least one digital file to the native application; and creating the at least one NFT containing the at least one digital file linked to the native application. This exemplary embodiment or another exemplary embodiment may further provide linking a first digital file to the native application; linking a second digital file to the native application; creating a first NFT containing the first linked digital file; creating a second NFT containing the second linked digital file; and transferring the first and second NFTs to the digital wallet. This exemplary embodiment or another exemplary embodiment may further provide wherein the first digital file further comprises: an image of a tangible item. This exemplary embodiment or another exemplary embodiment may further provide wherein the first digital file further comprises: one of a photograph, video, 3D image, and a drawing. This exemplary embodiment or another exemplary embodiment may further provide wherein the second digital file further comprises: a digital deed to a tangible item. This exemplary embodiment or another exemplary embodiment may further provide wherein transferring the second NFT to the digital wallet further comprises: transferring the deed to the tangible item; and transferring ownership of tangible item along with the deed. This exemplary embodiment or another exemplary embodiment may further provide transferring physical possession of the gift card to effectively transfer ownership of the digital wallet, the first NFT, the second NFT, and the ownership of the tangible item.

In yet another aspect, an exemplary embodiment of the present disclosure may provide a method of controlling title to a tangible item comprising: minting at least one non-fungible token (NFT) to a blockchain representing at least one image of a tangible item for sale; minting at least one additional NFT to the blockchain representing a digital title to the tangible item; minting at least a second additional NFT to the blockchain with data about the tangible item, including at least one of a description of the tangible item, an appraisal of the tangible item, a certificate of authenticity for the tangible item, and a physical location of the tangible item; and transferring all of the NFTs minted to the blockchain to a controlled program digital wallet owned by a seller of the tangible item. This exemplary embodiment or another exemplary embodiment may further provide listing the tangible item for sale on a public marketplace; selling the tangible item to a purchaser; minting a digital deed to the blockchain to certify the purchase; and transferring the NFTs from the controlled program digital wallet to a digital wallet owned by the purchaser. This exemplary embodiment or another exemplary embodiment may further provide delivering physical possession of the tangible item to the purchaser. This exemplary embodiment or another exemplary embodiment may further provide storing the tangible item on behalf of the purchaser. This exemplary embodiment or another exemplary embodiment may further provide wherein minting at least one NFT representing at least one image of a tangible item for sale further comprises: minting a plurality of NFTs representing a plurality of images of the tangible item, wherein each image of the plurality of images is minted as a single NFT. This exemplary embodiment or another exemplary embodiment may further provide creating the controlled program digital wallet owned by the seller of the tangible item prior to transferring all of the NFTs minted to the blockchain. This exemplary embodiment or another exemplary embodiment may further provide re-listing the tangible item for a subsequent sale by the original purchaser; selling the tangible item to a second purchaser; minting a second digital deed to the blockchain to certify the second purchase; and transferring the NFTs from the digital wallet owned by the original purchaser to a digital wallet owned by the second purchaser. This exemplary embodiment or another exemplary embodiment may further provide delivering physical possession of the tangible item to the second purchaser. This exemplary embodiment or another exemplary embodiment may further provide storing the tangible item on behalf of the second purchaser. This exemplary embodiment or another exemplary embodiment may further provide creating at least one encrypted wallet key. This exemplary embodiment or another exemplary embodiment may further provide wherein creating at least one encrypted wallet key further comprises: dividing the key into a first part and a second part; encrypting the first part of the key with a first cipher; and encrypting the second part of the key with a second cipher. This exemplary embodiment or another exemplary embodiment may further provide dividing the key into the first part, the second part, and a third part; encrypting the third part of the key with the second cipher. This exemplary embodiment or another exemplary embodiment may further provide storing the first part of the key in a minter database; transferring the second part of the key to the controlled program digital wallet owned by the seller; and storing the third part of the key in a native application separate from the digital wallet owned by the seller. This exemplary embodiment or another exemplary embodiment may further provide wherein the first cipher further comprises: an activation programming interface (API) cipher. This exemplary embodiment or another exemplary embodiment may further provide wherein the second cipher further comprises: a server cipher.

In yet another aspect, an exemplary embodiment of the present disclosure may provide a system comprising: at least smart device hosting a native application; at least one processor capable of executing logical functions in operable communication with the native application; and at least one non-transitory computer readable storage medium having instructions encoded thereon that, when executed by the processor, implements operations to control title to a tangible item, the instructions comprising: mint at least one non-fungible token (NFT) to a blockchain representing at least one image of a tangible item for sale; list the tangible item for sale on a public marketplace; complete a sales transaction of the tangible item to a purchaser; mint at least one additional NFT to the blockchain representing a digital title to the tangible item upon the completed sales transaction of the tangible item; mint at least a second additional NFT to the blockchain with data about the tangible item, including at least one of a description of the tangible item, an appraisal of the tangible item, a certificate of authenticity for the tangible item, and a physical location of the tangible item; transfer all of the NFTs minted to the blockchain to a controlled program digital wallet owned by a seller of the tangible item; mint a digital deed to the blockchain to certify the purchase; and transfer the NFTs from the controlled program digital wallet to a digital wallet owned by the purchaser. This exemplary embodiment or another exemplary embodiment may further provide wherein the instructions further comprise: re-list the tangible item for a subsequent sale by the original purchaser; sell the tangible item to a second purchaser; mint a second digital deed to the blockchain to certify the second purchase; and transfer the NFTs from the digital wallet owned by the original purchaser to a digital wallet owned by the second purchaser. This exemplary embodiment or another exemplary embodiment may further provide wherein the instructions further comprise: create at least one encrypted wallet key. This exemplary embodiment or another exemplary embodiment may further provide the instructions further comprise: divide the at least one encrypted wallet key into a first part, a second part, and a third part; encrypt the first part of the at least one encrypted wallet key with a first cipher; encrypt the second part of the at least one encrypted wallet key with a second cipher; and encrypt the third part of the at least one encrypted wallet key with the second cipher. This exemplary embodiment or another exemplary embodiment may further provide wherein the instructions further comprise: store the first part of the at least one encrypted wallet key in a minter database; transfer the second part of the at least one encrypted wallet key to the controlled program digital wallet owned by the seller; and store the third part of the at least one encrypted wallet key in the native application separate from the digital wallet owned by the seller.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

DETAILED DESCRIPTION

Figure 1A:
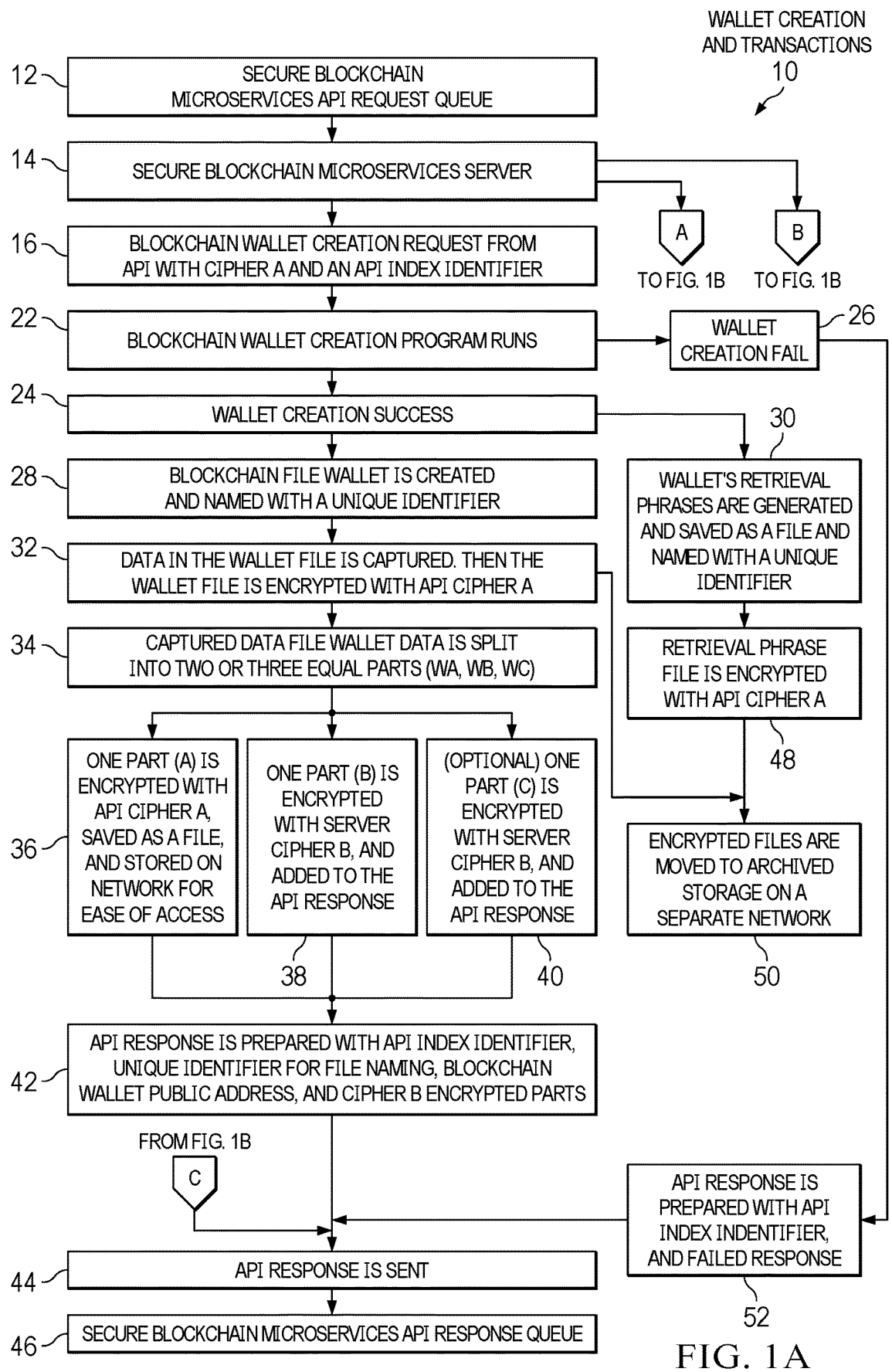
FIG. 1A (FIG. 1A) is a flow chart illustrating processes for creation of a digital wallet and performing blockchain based digital asset transactions.

As mentioned above, decentralized blockchain platforms are duplicated across peer-to-peer networks which may render its entries, at least in theory, immutable because a bad actor would not be able to gain access to the entire distributed network. For example, someone wishing to hack a blockchain would need to control more than 51% A of the nodes across the entire network to be able to effectively gain control of the blockchain. The amount of bandwidth and time required to do so renders it practically impossible to undertake such as enterprise across a large expanded blockchain network.

It is also this decentralized peer-to-peer network system that provides widespread and broad access to blockchain technology. Specifically, nearly any person having sufficient internet connection and computing capabilities may access and utilize the blockchain. With the advent of next generation web-based networking technology, including Web3 and the Metaverse, more and more users become capable of accessing blockchain and blockchain technology even from their home PCs. Thus, innovation in the fields of blockchain technology, including innovation relating to non-fungible tokens (NFT), cryptocurrency, and other digital assets are necessarily rooted in improvement upon existing computer technology and a rise in the realm of computer networking, more particularly decentralized peer-to-peer networking.

Similarly, improvements in these fields are understood to include improvements to increase access to blockchains, improvements on the efficiency, cost, and/or speed of blockchain transactions, as well as improvements to the methodology of applying blockchain and other digital asset technology to enhance usability of decentralized finance and blockchain technology for end users. This may include methodologies of streamlining the user interface and/or improving the privacy, accessibility, usability, and/or user friendly aspects of the blockchain experience.

Accordingly, as provided herein, several methods are presented to enhance the user experience in interacting with blockchain technology, including digital assets, such as NFTs or the like. Further provided are methods and processes to improve the efficiency, speed, cost, and security of NFT and other blockchain-based transactions. Additionally, provided are methods of linking blockchain and digital assets with real world tangible goods to enhance the end user's experience while providing increased digital security and further improving the authentication and protection of title to the tangible goods underlying the digital asset transactions.

The methods provided herein may be carried out utilizing computer systems having suitable hardware including one or more processors, logics, series of logics, or the like in operable communication with at least one non-transitory storage medium, the combination being operable to perform the necessary functions described herein. While it is recognized that any suitable computer system having minimal required processing power and a stable internet connection may be utilized, it will be further understood that the improvement to existing technological-based functionality lies not in the implementation utilizing specific hardware but instead in the improvements relating to the functionality and enhanced performance of carrying out the processes described herein.

Figure 1B:
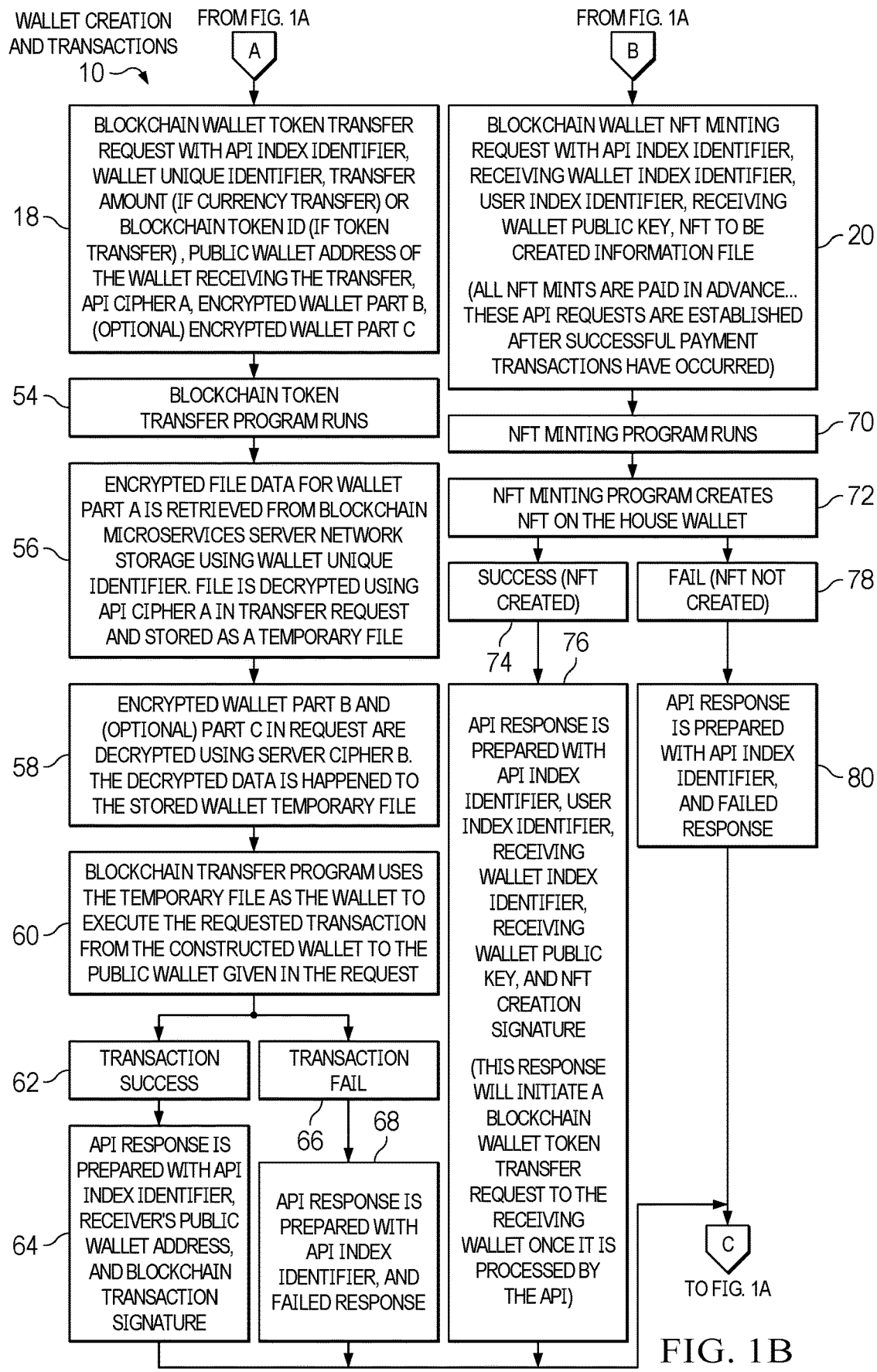
FIG. 1B (FIG. 1B) is a flow chart continued from FIG. 1A illustrating processes for creation of a digital wallet and performing blockchain based digital asset transactions.

With reference now to FIGS. 1A and 1B, flowcharts are shown indicating the processes for creation of a digital wallet and for transactions relating thereto. This process is generally referenced as process 10 and first includes a secure blockchain microservices activation programming interface (API) request from an API request queue indicated at reference 12.

The microservices API request queue may generate an API request and send that to a secure blockchain microservices server. To maximize the effectiveness of process 10, the microservices server should be able to run at least a minimal install terminal operating system and only necessary packages should be installed. These packages may include a curl package, an SSL and/or encryption package, a programming language package, or packages, for the language/s of choice and the command line tools and/or SDK packages for the blockchain in use. As mentioned above, this server may be in constant communication with the API request queue and should be configured and dedicated with a single blockchain. For security purposes, it is preferred that any databases associated with process 10 are installed or otherwise available to this microservices server. Further, it will be understood that the only function of this server is to be in persistent communication with a Secure Block Chain Request API. Therefore, again for security and efficiency purposes, all root or admin access to this server directly from an external login should be revoked. Low level users can login and then elevate permissions as necessary with the appropriate credentials. No external access should be available to the server accept through either a VPN or an SSH connection on a single obscure port.

It is contemplated, as mentioned above, that the microservices server is dedicated to a single blockchain. Accordingly, where the API request queue may prompt an action to perform a function on more than one blockchain, those requests should be separated and sent to separate blockchain microservices servers. Sending the request to the server is indicated at reference 14. The function of sending the request should be performed on a continuous or semi-continuous basis, with requests between the API queue and the microservices server being made at least once every ten seconds. Each request should include a valid microservices security token with it, along with an action type for the request.

It is this request type from the API request queue to the microservices server that may then determine the next steps in process 10. Specifically, the API request action type may be to create a blockchain wallet using a first API cipher A and an API index identifier, shown at reference 16. A second request may include a wallet token transfer request, shown at reference 18, and a third request may be for a blockchain wallet NFT minting request, shown at reference 20. Each of the wallet creation requests 16, wallet token transfer requests 18, and/or wallet NFT minting requests 20 are considered blockchain action requests. Each of these requests require a user security token, as discussed below. Encrypted security token and action requests are received from these calls and the user database is queried. If the security token is valid an insert is made into the blockchain actions database with an equivalent status of 'request', the ID of the user wallet to use, the action to be performed, and any additional variables required to complete the transaction such as amounts, token identifiers, public wallet addresses etc. If the user token is invalid or the action fails to insert into the database, an error is sent as a response. If the action is successfully recorded into the database, a success response is sent.

Looking first at a blockchain wallet creation request (at reference 16), the request may initiate a blockchain wallet creation program 22 which may offer two results; namely, a wallet creation success result, shown at reference 24, or a wallet creation fail result, shown at reference 26. In particular, if the request commands require wallet keys to be executed, data is taken from the request response for that transaction to access the Secure Encryption Keys API and a call is made at that time to the Secure Encryption Keys Encryption API. Generally speaking, the call request and process is successful, the decrypted key is presented for use. If the call fails, an error is reported. As each request is executed, a response variable is ultimately created that contains the success or failure of each command request result. When all commands have been attempted, the response variable is sent to the Request API, as discussed below. If connections for requests or responses to the Request API ever fail, the response variable is stored and resent at intervals until a successful call is completed.

With regards to a successful wallet creation call, two elements are created; namely, a blockchain file wallet is created and is provided with a unique name identifier, shown at reference 28 while the wallet's retrieval phrases are simultaneously generated and saved as a separate file with a unique name identifier, shown at reference 30.

Having created and named the wallet at reference 28, next the data in the wallet may be captured and encrypted with an API cipher A shown at reference 32. This captured data may then be split into equal parts dividing the data into either two equal parts with a first part WA and a second part WB, or alternatively divided into three equal parts WA, WB, and a third part WC. The splitting of the wallet data into equal parts is shown at reference 34. Once the wallet data is split, each part may be encrypted with API and/or server ciphers, saved as a file, and stored. Specifically, as shown at reference 36, first part WA may be encrypted with a first cipher A, which may be an API cipher, and saved on the network for ease of access.

Similarly, private keys (security tokens) may be divided into multiple parts, with a first part encrypted and stored in the minting database, a second part stored in the user's cold wallet, and an optional third part stored in a native application, as discussed further herein.

With regard to second part WB, as shown at reference 38, second wallet part WB may be encrypted with a second cipher B, which may be a server cipher, and added to the API response. Where the data was split into three equal parts in step 34, third wallet part WC may then also be encrypted with the server cipher B and likewise added to the API response, as indicated at reference 40.

Once the equal parts WA, WB, and optionally WC are encrypted, an API response may be prepared with an API index identifier, a unique identifier for file naming, a blockchain wallet public address, and any of the wallet parts that were encrypted with cipher B, namely, second part WB and optionally third part WC. The preparing of the API response is indicated at reference 42.

Once the response is prepared, the API response may be sent to a microservices API response queue 46 for further processing and display to an end user microservices view (which may be an application interface or the like), as desired.

While the file wallet is created, the wallet data is captured and the data is split and encrypted, as described herein. Similarly, the retrieval phrases from step 30 may likewise be encrypted with the API cipher A, as seen at reference 48. Then, the encrypted files, including the wallet retrieval phrases and the wallet file encrypted with API cipher A in steps 32 and 48, may be moved to an archived storage on a separate network, as indicated at reference 50. This move may secure these files for later verification, and as a backup copy, as desired.

At the point that the blockchain wallet creation program is initiated, shown at reference 22, in the event that a wallet creation fail result occurs (reference 26), the next step may involve preparing an API response with an API index identifier and wallet creation fail response indicator. This response may be prepared as shown at reference 52, which may then be sent to the API response queue at references 44 and 46, respectively.

The second blockchain microservices server request shown at reference 18 may be to transfer a blockchain wallet token along with one or more of an API index identifier, a wallet unique identifier, a transfer amount or a token id, a public wallet address of the receiving wallet, and an API cipher A encrypted wallet parts WA and WB and optionally WC. When a transfer request is received by the microservices server, the blockchain token transfer program may run indicated at reference 54. Running this transfer program may allow the encrypted file data for the sending wallet, part WA is to be retrieved from the server network storage using the unique wallet identifier. The data is decrypted and stored as a temporary file as indicated at reference 56.

Next, at reference 58, part WB and optionally part WC of the sending wallet data may be decrypted and appended to the temporary file. Once all wallet parts WA, WB, and optionally WC are stored in the temporary file, the transfer program may utilize the temporary file to execute the requested transaction to send the transfer request to the receiving wallet, as indicated at reference 60.

If the transfer is successful, indicated at 62, the API response may be prepared with the index identifier public wallet address of the receiving wallet and blockchain transaction signature indicated at 64. If the transaction is not successful, as seen at reference 66, the API response may be prepared with the index identifier and the failed response indication as seen at reference 68. Regardless of the success or failure of the transfer, once the API response is prepared with the relevant information and the API response may be sent (reference 46) and delivered to the API response queue (reference 46).

With regards to the third API request type received by microservices server, a call may be sent to mint a new blockchain wallet NFT, again as seen at reference 20. A request to mint an NFT may include an API index identifier as well as identifying information for the receiving wallet, user, the receiving wallet public key, and the information relating to the NFT to be created.

When a new NFT minting request is received, the NFT minting program may be executed shown at reference 70 and the NFT minting program may create the NFT on the house wallet, i.e. the wallet owned and controlled by the minting service, as shown at reference 72. As with prior requests, the NFT minting request may result in a successful NFT creation seen at reference 74, which may prompt an API response indicating the relevant related information and creation signature. This response will automatically initiate a blockchain token transfer request once it is processed by the API server. This is shown at reference 76. Similarly, if the NFT minting request does not result in a successful NFT creation, a creation failure indication may be generated, shown at 78, and a failure indication response may be again prepared and sent, as indicated at reference 80.

NFTs may be minted using any suitable blockchain and minting procedure. According to one aspect, NFTs may be minted on the Solara blockchain. According to another aspect, NFTs may be minted using smart contract, terminal commands, or a combination of smart contracts and terminal commands, as desired.

Figure 2A:
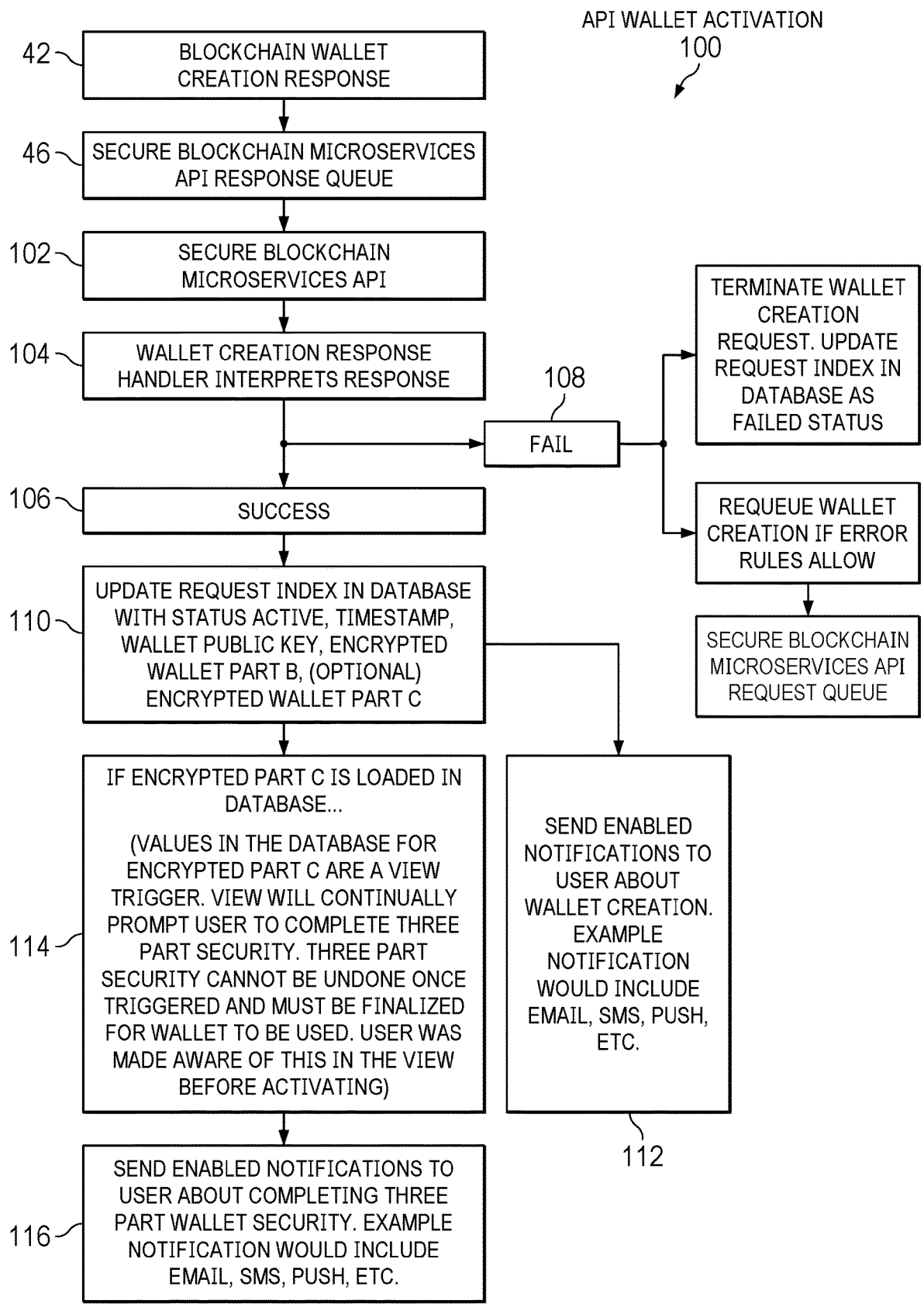
FIG. 2A (FIG. 2A) is a flow chart illustrating a process for activation programming interface (API) based wallet activation functions.
Figure 2B:
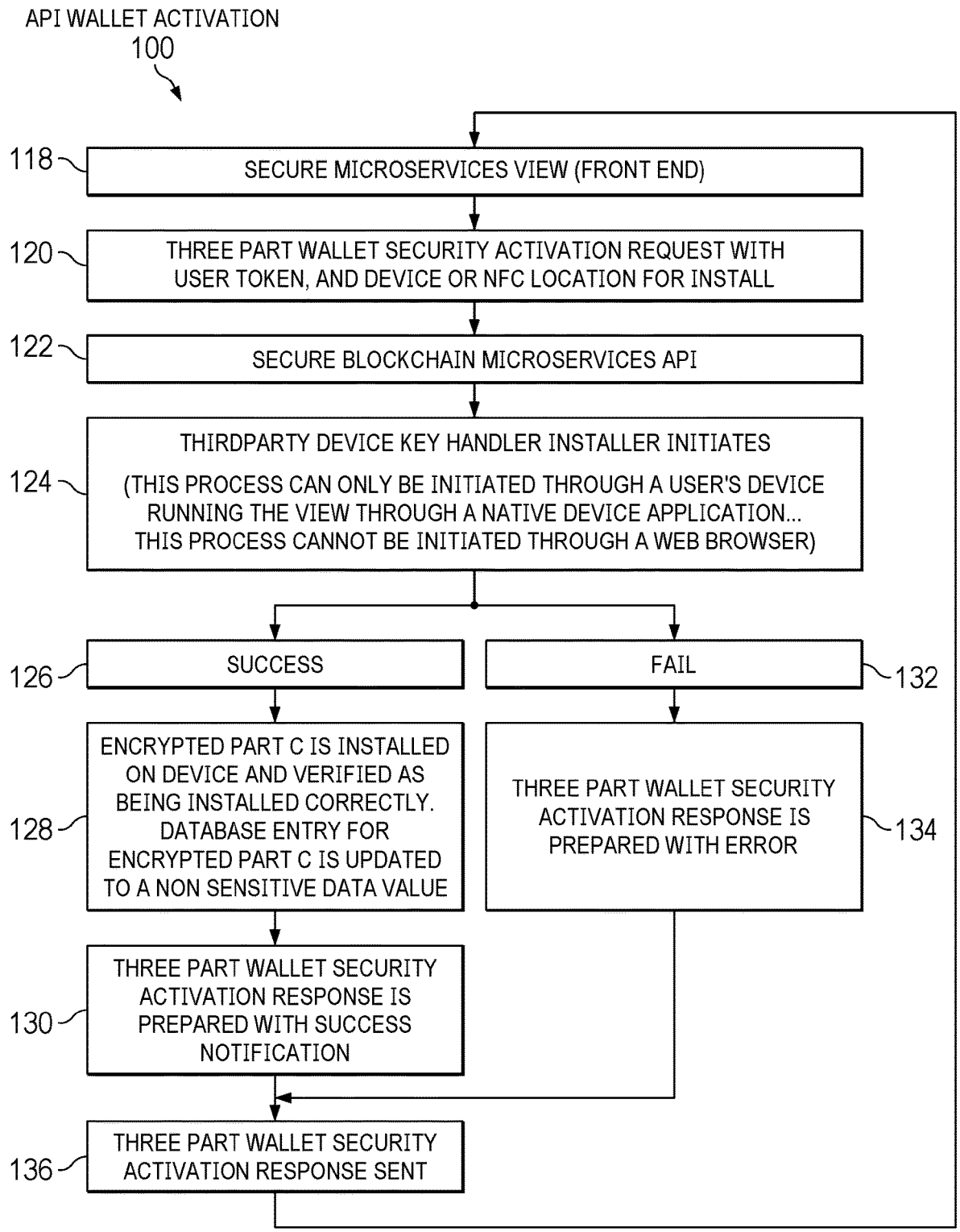
FIG. 2B (FIG. 2B) is a flow chart continued from FIG. 2A illustrating a process for activation programming interface (API) based wallet activation functions.
Figure 3A:
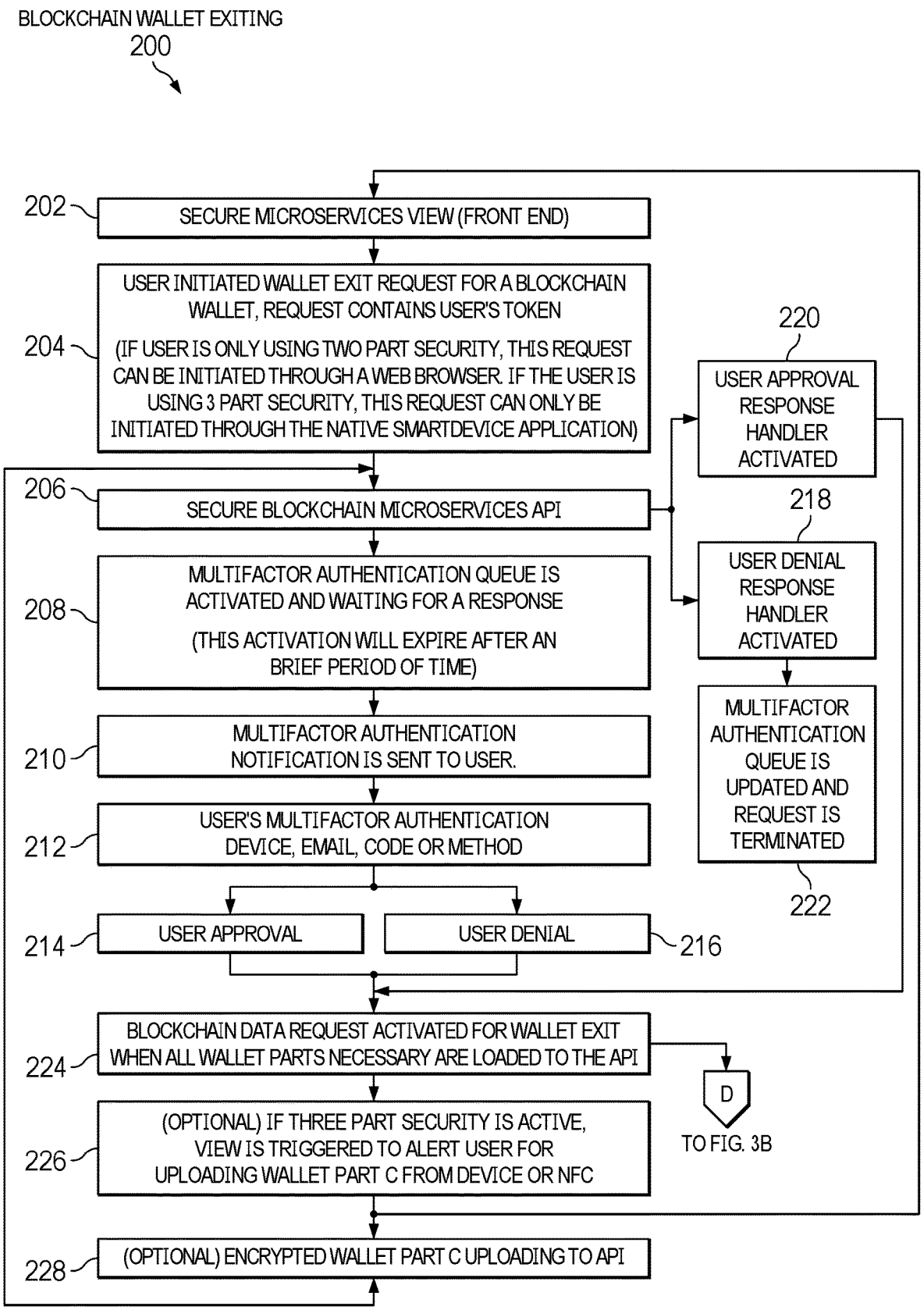
FIG. 3A (FIG. 3A) is a flow chart illustrating a method and/or process for exiting a blockchain wallet while maintaining possession and control over the digital assets contained therein.
Figure 3B:
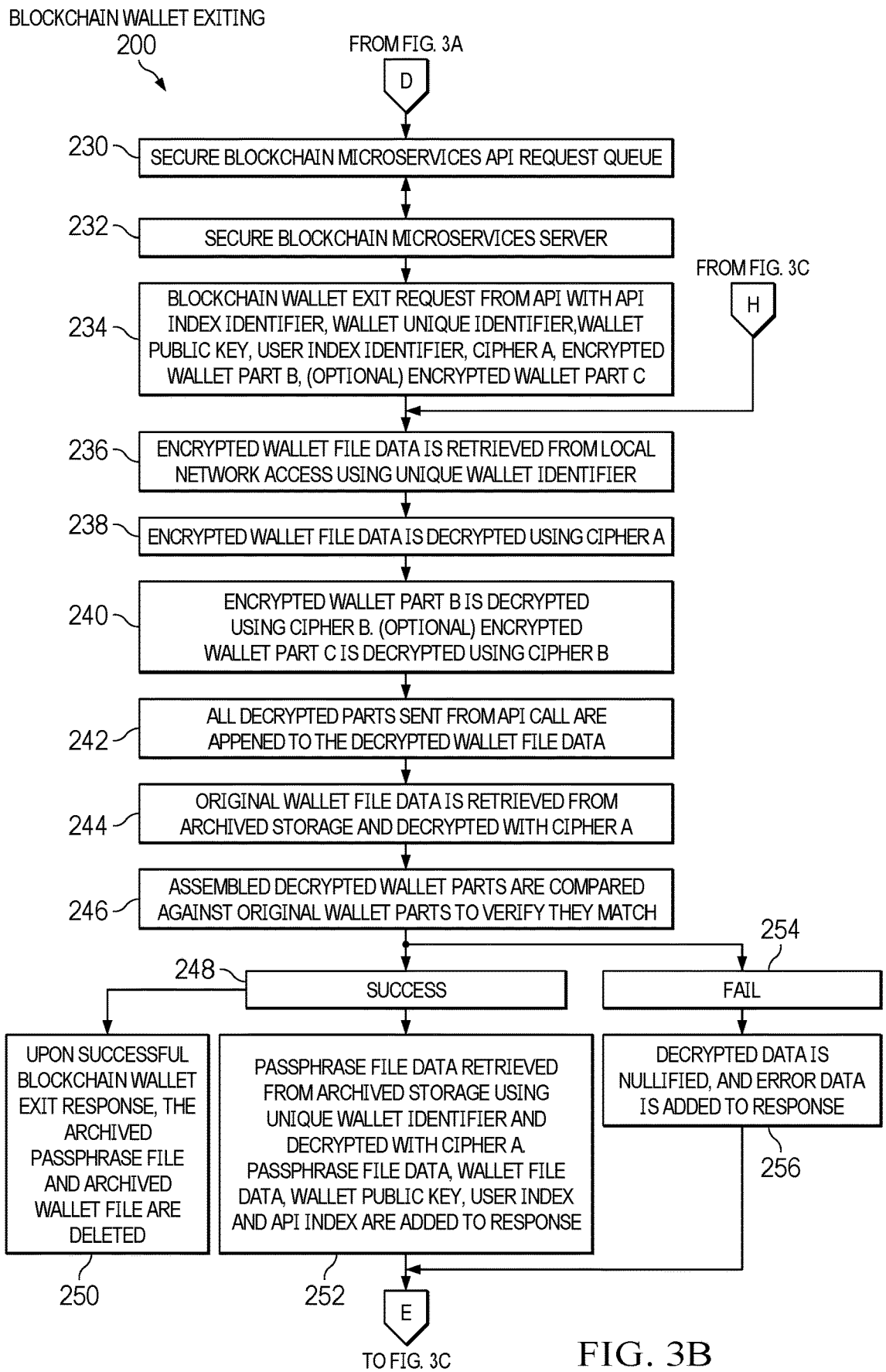
FIG. 3B (FIG. 3B) is a flow chart continued from FIGS. 3A, 3C, and 3D illustrating a method and/or process for exiting a blockchain wallet while maintaining possession and control over the digital assets contained therein.
Figure 3C:
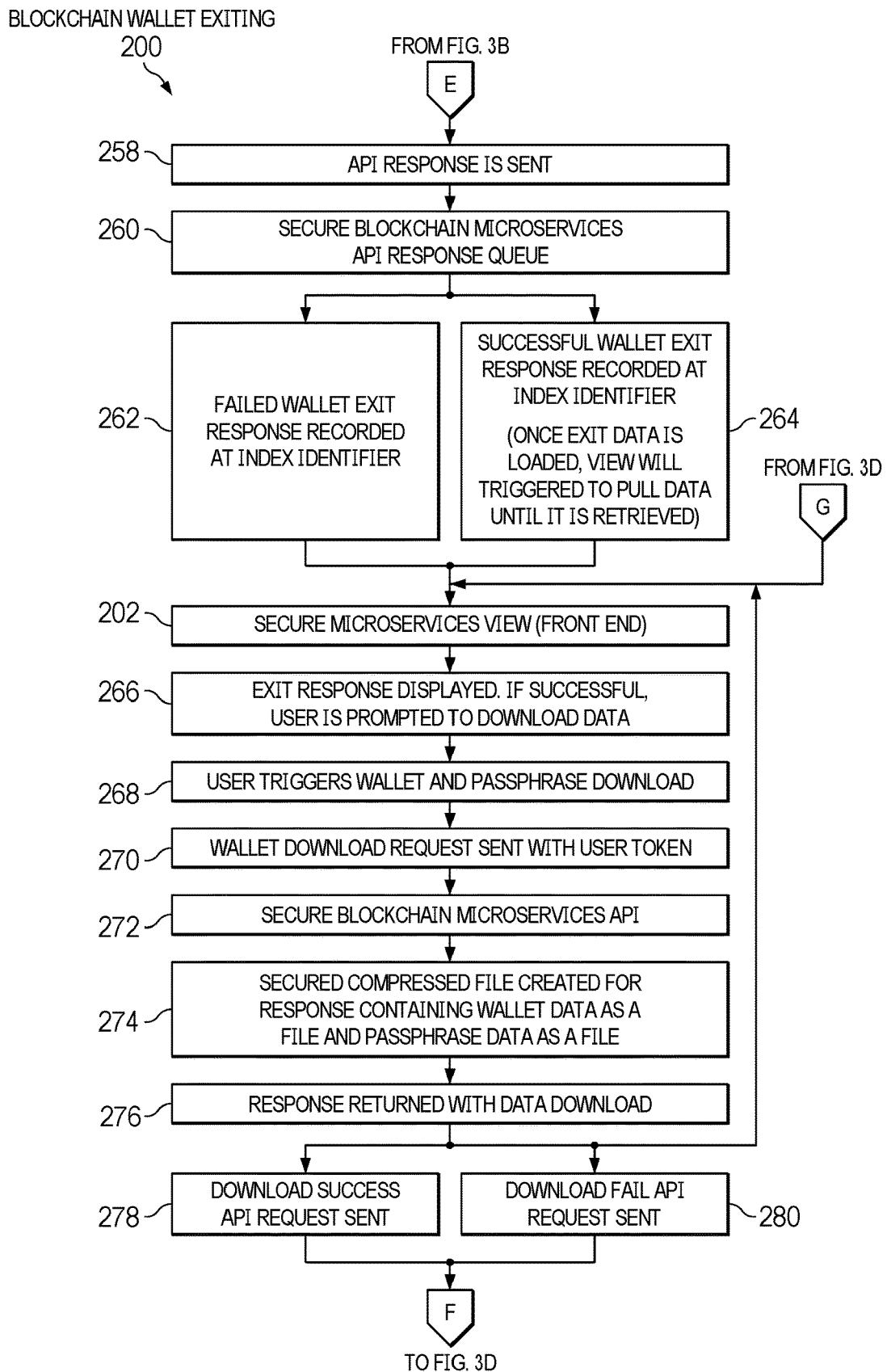
FIG. 3C (FIG. 3C) is a flow chart continued from FIGS. 3B and 3D illustrating a method and/or process for exiting a blockchain wallet while maintaining possession and control over the digital assets contained therein.
Figure 3D:
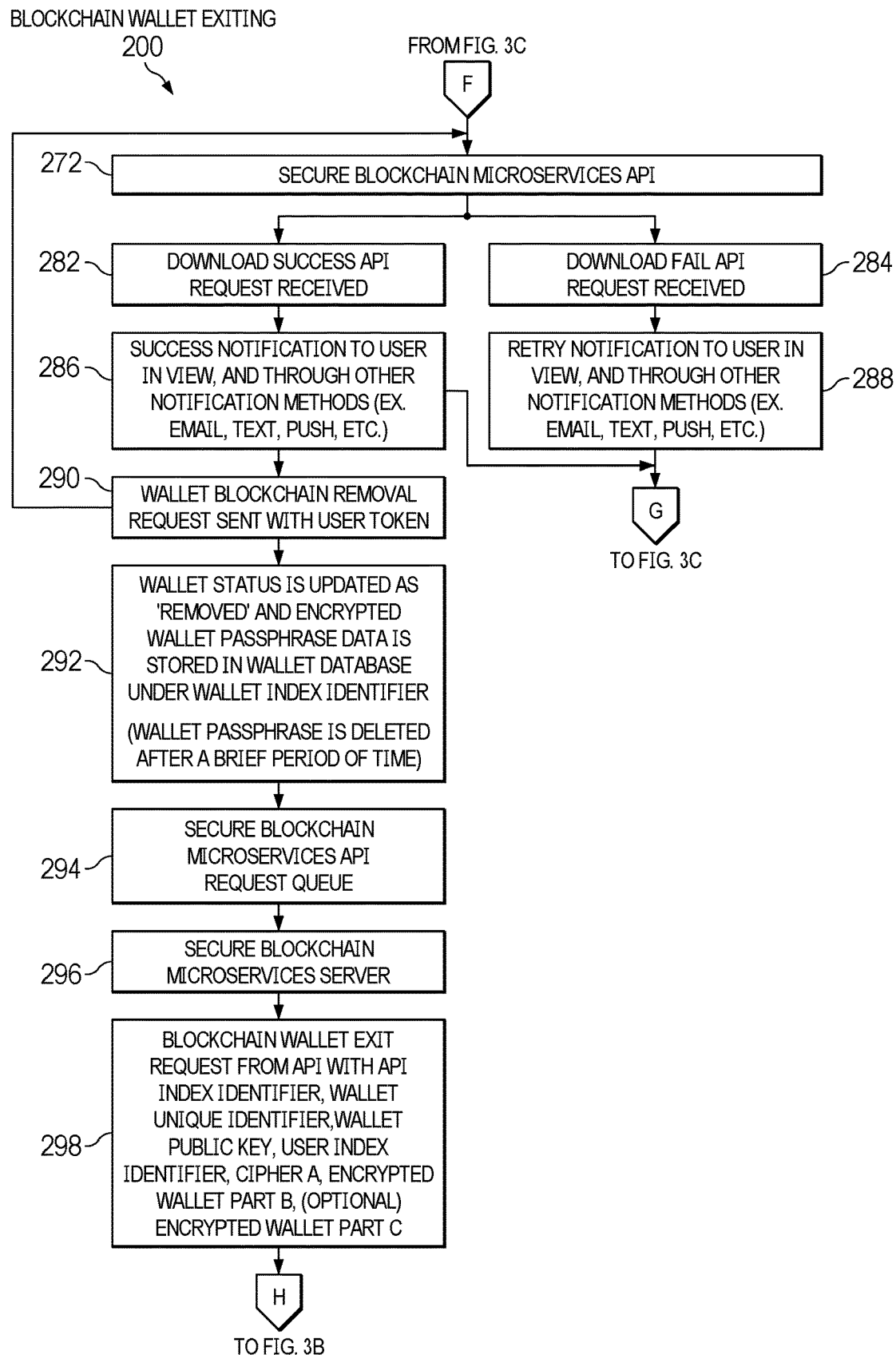
FIG. 3D (FIG. 3D) is a flow chart continued from FIG. 3C illustrating a method and/or process for exiting a blockchain wallet while maintaining possession and control over the digital assets contained therein.

With reference to FIGS. 2A and 2B, API wallet activation processes are shown as a series of flowcharts. These requests are considered blockchain microservices requests, and again require a security token. In performing these requests, as discussed below, the microservices token database is queried and if the security token is valid, the blockchain actions database is queried and a response variable is created that contains each blockchain action that is labeled as 'requested'. Once the action is in the response variable, the blockchain action database updates the action as 'pending'. When all actions are updated the response is sent. If the security token is invalid or an error occurs during the formation of a response variable, an error is sent as the response. If a response error is sent and actions were marked as 'pending', the actions database is updated and each request marked as 'pending' from the error call is set back to 'requested'.

Similarly, blockchain microservices response requests also require a security token. Again, as will microservices requests, response request will prompt an inquiry to the microservices token database and if the security token is valid, the blockchain actions database is queried in accordance to the action items listed in the response variable. Each action item is updated in the database accordingly as either 'completed' or 'failed'. When all action items have been updated a success response variable is sent. If the security token is invalid or an error occurs during the formation of a response variable, an error is sent as the response.

Accordingly, the process shown in FIG. 2A is a blockchain microservices request showing the wallet creation response in response to the API response indicated at reference 42 in FIG. 1A being sent at reference 44 to the API response queue at 46. This response queue may generate the blockchain wallet creation response indicated at reference 102, which may begin the process wherein the wallet creation response handler interprets the API response 46 and determines if the wallet was successfully created in the prior process. This determination is shown at reference 104 with a successful creation response shown at reference 106 and an unsuccessful or failure response shown at reference 108.

If the wallet creation response was in fact successful, the microservices API server will update the request index in the database with an active status, including data relating to the wallet such as timestamp, public key data, and encrypted wallet parts WB and optionally WC. This is indicated at reference 110. If the update request includes only second part WB, a notification to the wallet owner or end user may be prepared and delivered to the user regarding the wallet creation. Notifications may include email, SMS, Push or in-app notifications or the like. This is indicated at reference 112.

Alternatively, if third part WC of wallet is included and is then loaded into the database, this may prompt an additional securities feature wherein the end user is prompted to complete the three-part security process described above that must be completed prior to final activation of the end use of the created wallet. This is indicated at reference 114. Only after the three-part security process is triggered, only then will the user receive the notification to complete the three-part security process to finalize activation of the generated wallet. This is indicated at reference 116.

With reference to FIG. 2B, shown is the three-part security process (as a microservices response request) wherein the front end of the secure microservices view is now indicated at reference 118, which generates a three-part wallet security activation request in response to encrypted part WC being loaded into the database as seen at reference 114. This three-part request is shown at reference 120 and is sent to the secure blockchain microservices API shown at block 122. Once the user is notified to complete the three-part security process, a third party device key handler installer initiates, which can only be initiated through a proprietary application and cannot be initiated through a web browser. This is indicated at block 124. If the installation is a success (reference 126), encrypted third-part WC is installed on the device and verified as being installed correctly. The database entry for encrypted part WC may be updated to a non-sensitive data value shown at reference 128, and the third part wallet security activation response may be prepared for sending, indicating a successful activation (reference 130). If the installation process fails due to improper verification, improper installation, or user error (shown at block 132), the three-part security activation response is prepared indicating the error (block 134). In either scenario, whether the activation is successful or not, the notification response is sent back to the front end view as indicated at reference 136.

With reference to FIGS. 3A-3D, a process for exiting a blockchain service in possession of a blockchain wallet is shown and generally indicated as process 200. Beginning with the secure microservices view shown at block 202, the process for exiting the blockchain, including with or without optional third-part WC of the wallet, is shown as begins with a user initiated exit request containing the user's token. This request is indicated at reference 204. If the user requesting the wallet exit is utilizing two-part security, i.e. does not include third wallet part WC, the request may be initiated through a web browser and sent to the secure blockchain microservices API at reference 206. This will trigger a multifactor authentication queue shown at 208 and will send a notification to the user at reference 210.

This notification may request the user's authentication device email code or method shown at reference 212. Whether approved (reference 214) or denied (reference 216), this data will be forwarded to the blockchain data request activation shown at reference 224. Simultaneously, alongside activating the multifactor authentication queue, the blockchain microservices API will activate the user denial response handler shown at reference 218 and the user approval response handler shown at reference 220. If the user denial response is indicated (i.e. the user cancels the transaction), shown at reference 222, the authentication queue is updated and the request is terminated. Alternatively, if the user approves continuing with the transaction, the multifactor authentication approval or denial are coupled with the user's ongoing approval to activate the data request to exit when all parts necessary are loaded to the API indicated at reference 224. Here, if optional third-part WC of wallet and three-part security is active, the view is triggered to alert the user to upload wallet part WC from their device and into the system. This step is indicated at reference 226. Alternatively, the third wallet part WC may be automatically uploaded at the onset through the user's interface. This optional step is indicated at reference 228.

Once the user request is generated and authenticated and all parts are present, including optional part WC where applicable, the request may be entered into the API request queue shown at reference 230 and forwarded and/or communicated between the API request queue and the secure blockchain microservices server shown at reference 232. Once the request is received by the server, whether through direct forwarding from the request queue or through a server call to the request queue, the exit request may be generated with the unique identifying information (reference 234) and the wallet file data may be retrieved from the local network utilizing the wallet identifier shown at reference 236.

Once the data is retrieved, it may be decrypted in parts utilizing cipher A for first wallet part WA (reference 238) and cipher B for second and optional third parts WB and WC (reference 240). All decrypted parts from the API call are then appended to the decrypted wallet file data shown at block 242 and the original wallet filed data may be retrieved from archived storage and likewise decrypted, shown at reference 244. These two data files may then be compared to verify that they match as shown at reference 246.

Upon a successful match (reference 248), the archived pass phrase file and archived wallet file may be deleted from the archived storage shown at reference 250. The pass phrase file data may be retrieved from the archive storage utilizing the unique wallet identifier and may be added to the API response shown at reference 252. In the event of a failed match between the wallet file data and the archived file data (reference 254), the decrypted data is nullified and the error data is added to the response shown at reference 256. In either scenario, the API response is sent (reference 258) and communicated to the API response queue 260. The exit response is then further recorded at the index identifier with a failed response ending the process (block 262) and a successful response triggering a data pull until all data is retrieved (block 264). The exit response is then communicated through the microservices view 202 to the end user and the exit response is displayed. If the response is successful, the user is prompted to download their data (block 266) which triggers a wallet and passphrase download shown in block 268.

This response download is sent with the user token shown in block 270 to the secure blockchain microservices API and a secure compressed file will be created containing the wallet data and passphrase data as separate files for user download. The compressed file creation is indicated at block 274 while the data download is shown at block 276.

Once the response is returned with data download at reference 276, the download is sent to the user and communicated back to the user through the secure microservices view 202. The download is either achieved successfully indicated at 278 or unsuccessfully indicated at 280. Either result prompts communications to the secure blockchain microservices API 272 which then prompts a download success or download fail API request receive notice indicated at 282 and 284, respectively. If successful, the notification is sent to the user interface view 202 and is also sent to the end user through their preferred notification method, e.g. text, email, push notifications ATC. This success notification is indicated at reference 286. If the download fails, the notification is sent to the user of the failed download with a prompt to retry the download again. This retry notification is indicated at reference 288.

Upon a successful download, the wallet blockchain removal request is also sent with the user token (reference 290) and the wallet's status is updated as removed in the stored wallet database (reference 292). At this point, the blockchain API request queue is updated as well as the blockchain microservices server is likewise updated. These updates are indicated at reference 294 and 296, respectively and the system may reset pending a new wallet exit request shown at reference 298.

Figure 4A:
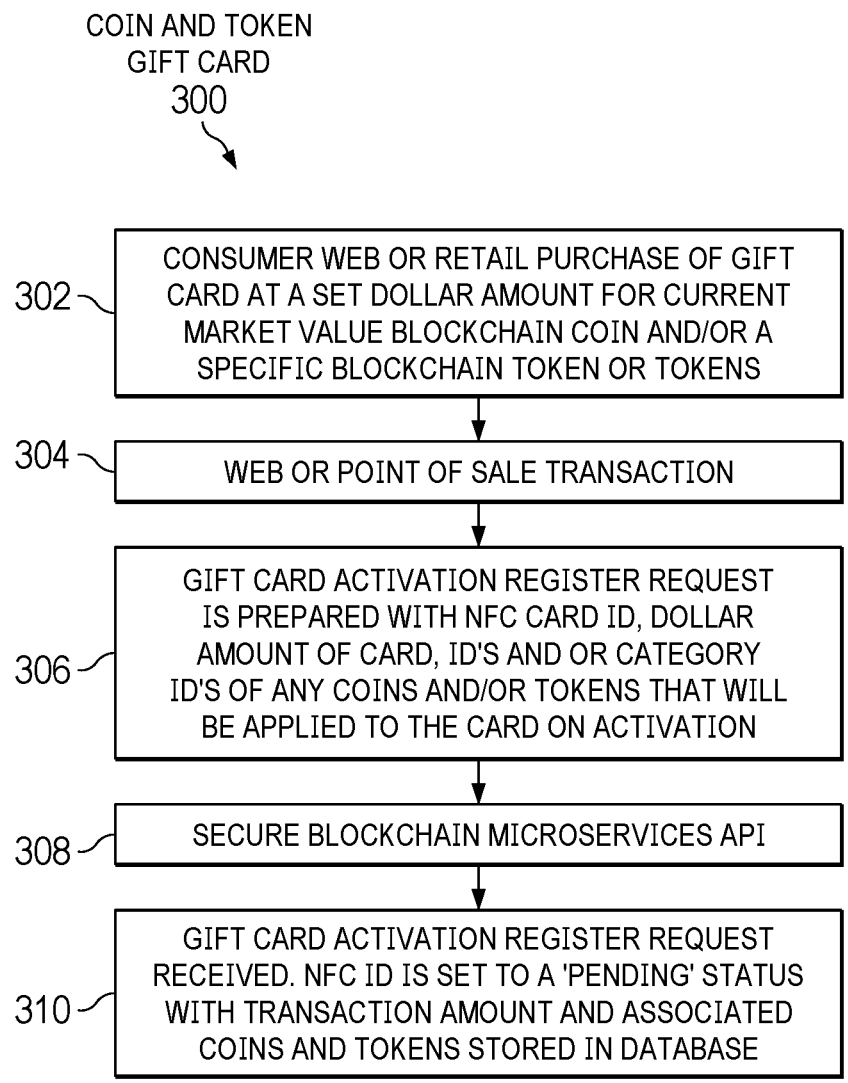
FIG. 4A (FIG. 4A) is a flow chart illustrating a process for purchasing a retail gift card loaded with digital assets.
Figure 4B:
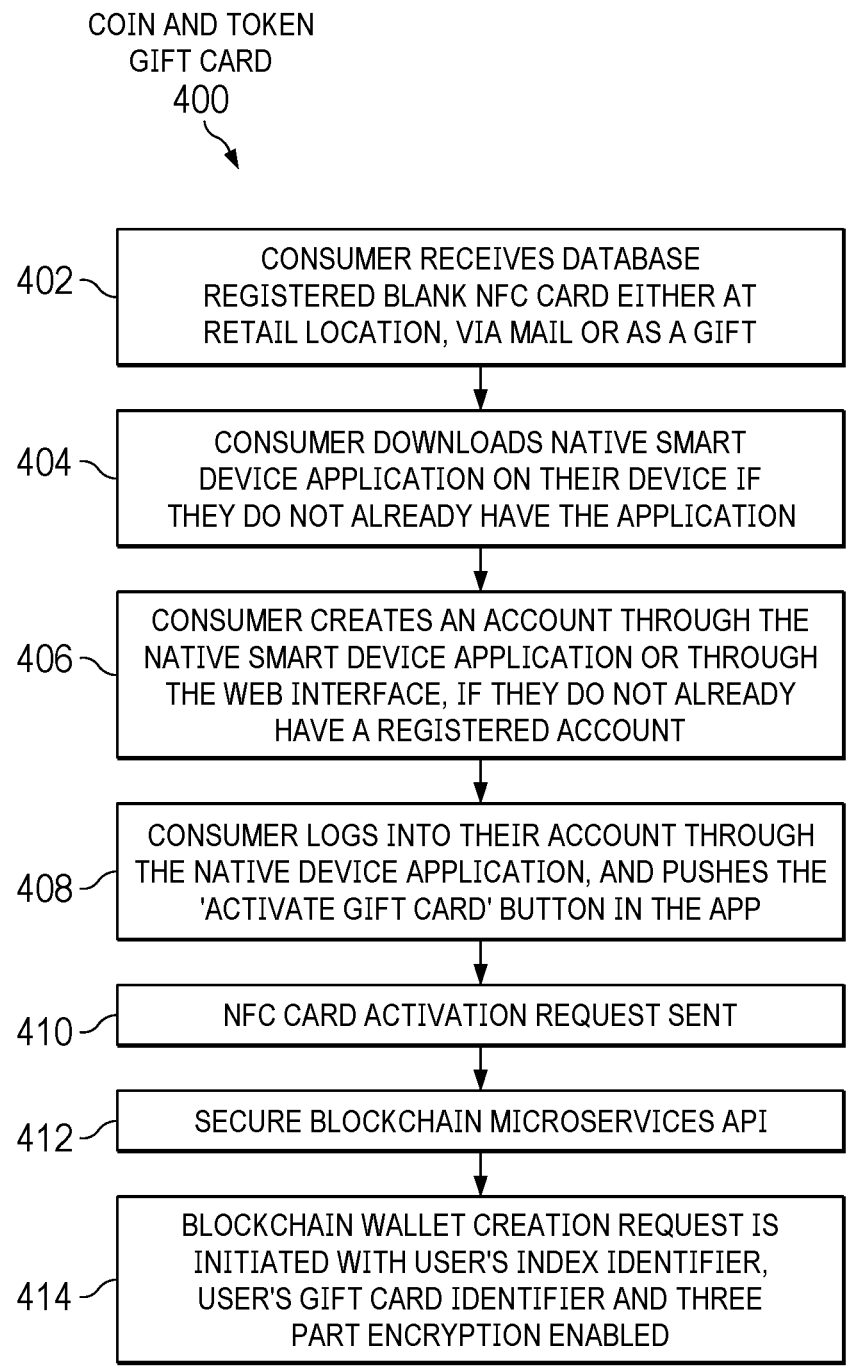
FIG. 4B (FIG. 4B) is a flow chart for transferring ownership of the physical gift card loaded with digital assets and minting a new digital wallet.
Figure 4C:
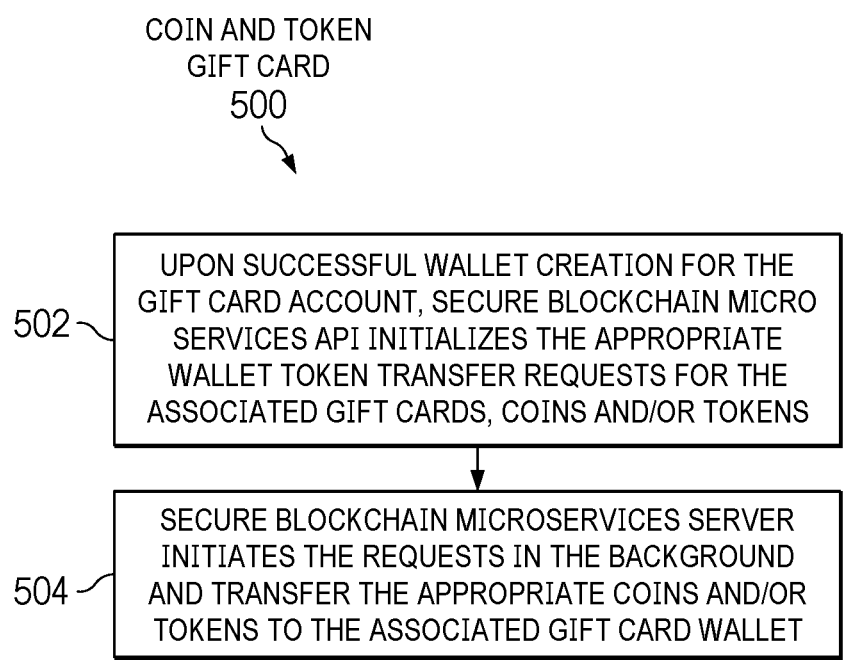
FIG. 4C (FIG. 4C) is a flow chart relating to the creation and transfer of digital assets upon a consumer's purchase of a related gift card.

With reference to FIGS. 4A-4C, a process for utilizing the blockchain to provide real world value on a gift card or the like are shown. First, with reference to FIG. 4A, a consumer purchase process is shown and indicated as process 300. Process 300 is initiated when a consumer purchases a retail or web-based gift card at a set dollar amount for a current market value blockchain digital asset. These assets could be coins, such as cryptocurrency coins or tokens, including NFTs. The purchase prompts the process and the purchase is indicated at reference 302. Next, the point of sale transaction occurs at reference 304 and the gift card is activated upon checkout. The gift card activation includes the NFC card ID, the dollar amount, identification and/or category identification of any coins and/or tokens that will be applied to the card on activation. The activation step is indicated at reference 306. This information is communicated to the secure blockchain microservices API at 308 and the activation register request is received. Upon receiving the register activation request, the NFC ID is set to pending and a transaction amount with the associated digital asset is stored in the database. This is indicated at reference 310.

With reference now to FIG. 4B, the consumer side of the utilization of gift card is shown as process 400 and is understood to begin at the point that the consumer receives the database registered NFC gift card either at the retail point of purchase, via mail or email, or as a gift. This is indicated at reference 402. The consumer then is prompted through the gift card instructions to download the device application if they do not already own or have the application. This is indicated at reference 404. If the consumer does not already have a registered account through the native smart device application, the consumer can create an account to manage their gift card (reference 406) and then log into their account utilizing the native device application. Once logged in, the consumer can activate the gift card in the application. The login and activation are shown at reference 408. The activation step initiated by consumer then prompts an NFC card activation request (reference 410) which is sent to the secure blockchain microservices API (reference 412) and a blockchain wallet creation request is initiated similar to the wallet creation request 16 in FIG. 1A. This creation request is indicated as reference 414 in process 400.

Once the wallet request is sent from process 400, an internal process may run and is shown and generally referenced as process 500. This internal process involves simply initiating the appropriate token transfer requests for the associated digital assets into the wallet. This process is not unlike the token transfer request 18 illustrated in FIGS. 1A and 1B and discussed above. This request in process 500 is indicated at reference 502 and once the request is sent and initialized, the secure blockchain microservices server initiates the request and transfers the appropriate digital assets as seen at reference 504. Again, process 500 is not unlike the token transfer request 18 of process 10 discussed previously herein.

Most of the actions taken in the processes described above require one or more security tokens, which may be encrypted credentials that are received as part of a call, or supplied later as part of a verification process, as discussed herein. In particular, different calls, including the calls above, may be made to the API microservices server, of which, requests to generate a security token are the only call types that do not require a pre-existing security token. In such instances, the user database would be queried to validate the user's credentials and a security token may be generated. If the user has enabled three factor verification, the user may be prompted for additional verification. Regardless of whether the request is a two factor or three factor security token request, any token produced as a result of the request would be sent at the API response. If the request fails, for example from invalid credentials, an error response is sent.

Figure 5:
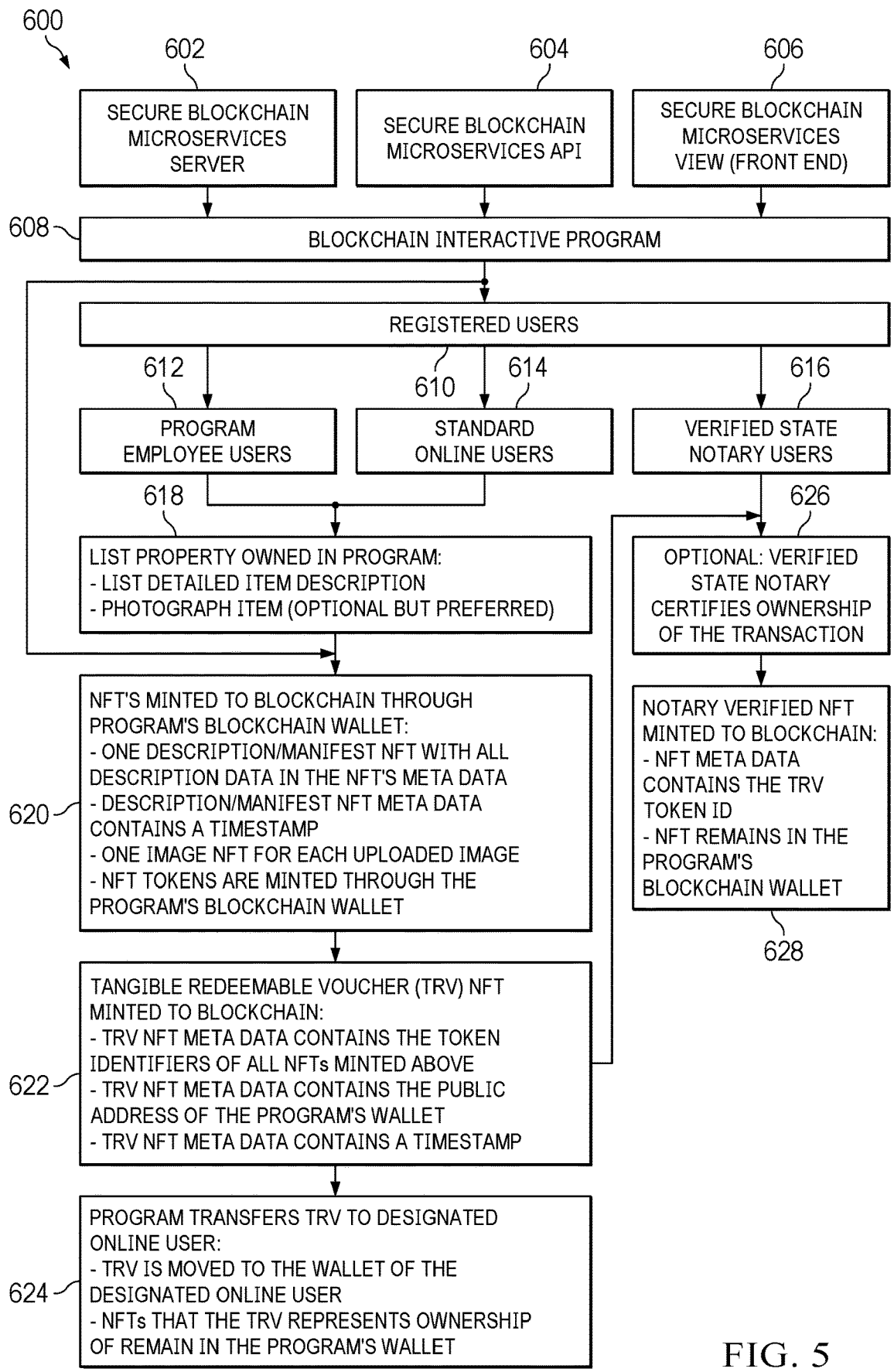
FIG. 5 (FIG. 5) is a flow chart illustrating the control of title to a tangible item utilizing the processes according to the present disclosure.

With reference to FIG. 5, a process for controlling title of a tangible item is shown and indicated as process 600. Process 600 is a process for controlling both title, ownership, and transfer of both the digital title and a tangible good. Specifically, a tangible good, such as a collectable or other similar physical item, may be listed for sale on any suitable marketplace. It is contemplated that this process may be utilized with a digital marketplace related to or otherwise contained within the end user native device operable to control the prior processes described herein. However, it will be understood that the specific marketplace may be any suitable marketplace including off-line or physical offers for sale.

Accordingly, an item, such as a collectable or the like, may be offered for sale prior to the purchase of an item, detailed 3D images may be produced, and other data may be minted into new blocks on the blockchain as NFTs relating the detailed 3D images, a digital deed or title, and other information such as appraisal information, authentication information for the collectable item, details relating to the physical location and current ownership of the item, and chain of control for the item from creation or valuation. According to one example, a collectable may be an antique, sports memorabilia, movie or music memorabilia, Disney memorabilia, or the like and the "creation date" may be the date that the item was verified authentic, the item was first purchased, the item was manufactured, or in some instances, the date that the item was autographed or otherwise personalized, as applied to certain collectables, such as sports memorabilia or the like.

Once the item is listed for sale, online buyers can view the detailed 3D images and may purchase the item and in receipt for their payment they may receive a digital wallet, which may be created by process 10 containing one or more NFTs relating to data about the physical item, including 3D image NFTs and/or title NFTs as applicable to that particular item. The item then may be shipped to the purchaser directly or alternatively may be stored for the purchaser to retrieve or otherwise maintain storage thereof until the purchaser desires to retrieve or sells the item again. Each subsequent sale may then generate a new NFT with the transfer information and a new certified digital deed along with all prior NFTs and digital assets associated with the item. The item may then be transferred physically to the new purchaser.

Accordingly, as shown in process 600, a similar request may come from or otherwise stem from the secure blockchain microservices server indicated at reference 602, the blockchain microservices API at reference 604 or from the user via the microservices frontend view indicated at reference 606. Each request, regardless of origin, may enter the blockchain interactive program indicated at 608 wherein a registered user 610, such as a program employee or a standard online user 612 and 614, respectively, may list the property owned in the native program such as a smartphone application, as discussed herein. Listing the property owned may include listing a detailed item description, uploading photographs, 3D images, renderings, or the like as well as any other digital or uploadable documentation such as certificates of authenticity, appraisal information, or any other suitable information. Additionally, verified state notary users 616 may be involved in the control process as they may offer notary services to certify any uploaded documents, certify the sale and/or certify any other suitable information as desired or dictated by the desired implementation. Optionally, shown at reference 626 and mentioned above, a verified state notary may certify the ownership of the transaction along with the transaction itself.

Once the property is listed in the program, NFTs may be minted to the blockchain through process 10 with separate NFTs for description data, metadata, each uploaded image including any 3D graphics or the like, as well as for the chain of title. This is indicated at reference 620.

In addition to NFTs, one or more transferrable redeemable voucher (TRV) NFTs may be minted to the blockchain containing token identifiers of all minted NFTs, public address of the program's wallet, and a metadata timestamp as to when each TRV NFT was created. This is indicated at reference 622. Once the NFTs are created, a token transfer request may be initiated to transfer the TRV NFTs to the designated online user. If this is prior to the sale, this transfer would be to the seller of the tangible item. If this is implemented as a post-sale process, the designated online user may be the purchaser. This transfer is shown at reference 624.

These TRV NFTs may create a bridge between tangible and intangible assets by provided an ownership interest in an underlying asset. An owner of a TRV NFT would have a legal claim to the underlying asset, as well as a claim to appreciation of the TRV NFT and to the underlying asset. Additionally, a TRV NFT can attach to an underlying asset to create a digital fingerprint that can allow anyone, via the blockchain, to trace, track, and authenticate the underlying asset. This can be done almost instantaneously from any location in the world with sufficient internet access and can reduce or eliminate fraud, forgery, or bait-and-switch sales by tying an immutable digital chain of title to the asset through these TRV NFTS, as discussed herein.

As mentioned above, it is optional that a verified state notary user 616 may verify the ownership and transaction indicated at 626. Once the NFTs are minted and transferred to the designated online user (e.g. the seller or seller's wallet) and the transaction is verified and the TRV NFTs are transferred, the NFT metadata containing the TRV NFT token IDs and the actual NFTs themselves may remain in the program's blockchain wallet until the item is sold, at which point they may be transferred to the purchaser.

Controlling the title and related data on the blockchain, and linking new NFTs with a tangible item, such as a collectable, may provide a clear and immutable history of the item while further enhancing the user experience for both the buyer and the seller. In the case of items of higher value, such as rare collectables or antiques, having this record may allow the item to retain its value and exclusivity over time, while further protecting the owner's ability to display or use the item. Linking unique digital assets to the item may further enhance these benefits.

This process 600, as well as the other processes provided herein, may be scalable to create a secure ownership environment wherein title to tangible property may be uniquely defined with immutable registrations on the blockchain. Further, those agencies tasked with providing certification of ownership of an underlying asset will have a near instantaneous means of readily establishing ownership and chain of title. Each of these may be further accomplished more efficiently, at a lower cost, and/or at a higher speed to enhance usability of decentralized finance and blockchain technology for end users via the processes discussed herein. This may again include methodologies of streamlining the user interface and/or improving the privacy, accessibility, usability, and/or user friendly aspects of the blockchain experience.

Figure 6:
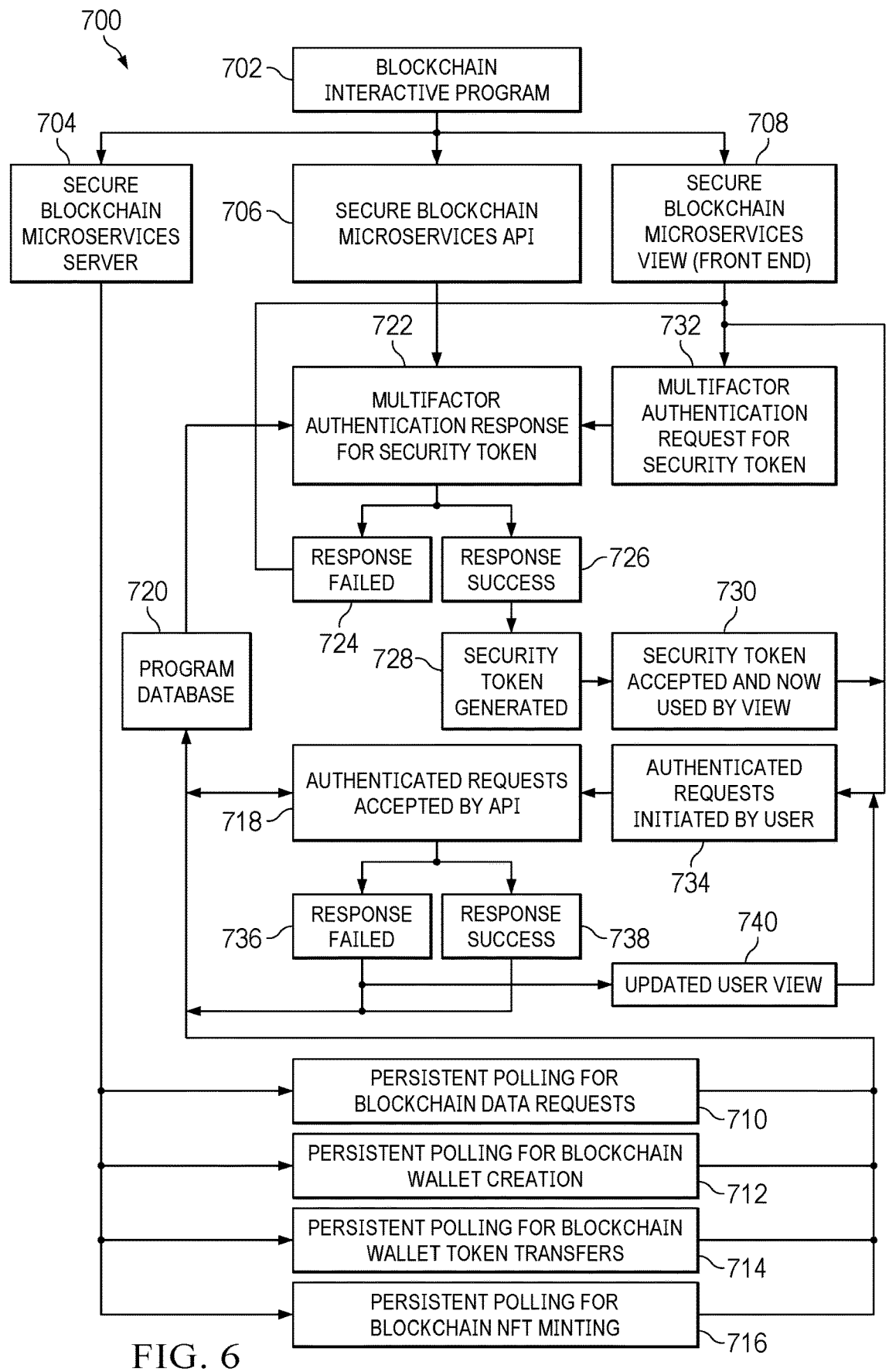
FIG. 6 (FIG. 6) is a flow chart illustrating an end user's interactive control of the processes according to the present disclosure.

With reference now to FIG. 6, another process is shown and indicated as process 700. This process shows the blockchain interactive program interface the end user may experience wherein they launch the interactive program indicated at reference 702, which may be the native application. Behind the scenes, this may activate the secure blockchain microservices server indicated at 704 and the microservices API at 706. Additionally, this will initialize the microservices frontend view at 708 for the user to control the experience.

Beginning with the secure blockchain microservices server, persistent pulling for data requests may occur, indicated at 710, alongside persistent pulling for blockchain wallet creation, at reference 712, and persistent pulling for blockchain wallet token transfers, at reference 714. Additionally, persistent pulling for blockchain NFT minting may occur, shown at reference 716. These are similar to the call requests between the API request queue and microservices server as indicated in process 10, discussed previously herein. As illustrated and discussed above, each of these requests may be received, which will prompt an authentication request and a program database query. The authentication request is indicated at 718 while the program database query is indicated at 720. In querying the database, as mentioned above, a request for authentication of a security token may be generated, which may result in a failed authentication shown at reference 724 or a successful authentication at reference 726, which will further generate a security token as seen at reference 728.

If the authentication fails, a response is sent to the end user through the frontend view 708 to prompt a multifactor authentication request for a security token indicated at reference 732. If the security token is generated at 728, the security token may be accepted and now may be used by the view indicated at reference 730. Once the security token is accepted, authentication requests initiated by users may be then sent to the API where the request may again be accepted and a failure response may be generated or a success response may be generated. These steps are indicated at reference 734, 718, 736, and 738, respectively. If the authentication request is accepted and the response is successful, as seen at reference 738, the user view is updated at 740 and notifications are sent to the end user.

In implementing one or more of the processes described herein, other processes may be likewise implemented or executed. For example, process 600 may involve some or all of process 10 in the creation of digital wallets, transfer of digital assets, and/or minting of new NFTs. Other processes described herein may interact or involve steps from other processes. Where steps and/or components overlap, they may have separate numbering in separate processes; however, it will be understood that certain portions may be substantially the same, may be identical, or may, in actuality, be the same components. For example, references to the secure microservices API server throughout the recited processes may refer to the same microservices API server.

In operation, the processes described herein may be implemented to not only generate or mint new NFTs to a blockchain in a more efficient and faster manner, but to simultaneously mint new virtual wallets, secure blockchain keys, and control title to tangible goods and objects. The processes further described herein may provide for safe, fast, and efficient exit from an NFT blockchain while maintaining control over the wallet containing the NFTs, and may further provide a new and novel way to purchase, transfer, share, and/or own NFTs and other blockchain based assets. In order to best convey these concepts, each will now be described using various examples. It will be understood that these implementations are not limiting, but instead are representative of potential applications of the disclosed processes and technology, and may be modified as desired. For example, where these representative scenarios are provided with reference to a specific blockchain (e.g. Solana), it will be understood that other blockchains (e.g. Ethereum) may be utilized where desired.

According to one aspect, a processes for minting new NFTs to a blockchain is described herein. In existing systems, minting an NFT typically utilizes one of a smart contract or one or more terminal commands. The standard process is that the funds for minting and supporting the NFT are withdrawn from the account requesting the NFT immediately, and the minting process begins. The current process is slow, as multiple bridges are employed to communicate between the API endpoints and the minter.

The present process allows for the elimination of bridges in that the minter only communicates with a single API endpoint, thus increasing the speed of the transaction and the speed at which the NFT is created or minted. Further, the present process may utilize a hybrid approach, with an initial smart contract that is agreed upon at the time the minting request is made, and then through the use of terminal commands throughout the minting process. This further may increase the speed and efficiency of the minter, which in turn reduces the cost and improves the minting process as a whole. As an example, when an NFT minting request is generated, the disclosed process, particularly where the minters call out to the API endpoints on a continuous or semi-continuous basis, is enhanced by the speed of communications directly between the minter and the API microservices server.

Simultaneous with the minting of the NFT, a wallet may be created and/or linked to the newly created NFT, and the keys allowing access to the newly created NFT may be generated. These keys may be split into either two or three parts, depending on the implementation. Specifically, where there is a cold wallet (e.g. a wallet that is stored/maintained offline), the keys may be split into three equal parts, with one part stored in the minter, one part in the cold wallet, and one part in an application or program that serves as the interface between the user (e.g. wallet owner) and the minter/minting service. This provides an extra layer of protection for the user as the keys are only accessible to the person having the cold wallet and the interface program access available to them, and there still exits a requirement that the holder of both of those can verify identity with the minter itself before the keys can be utilized.

If a user wishes to exit a blockchain service, current practice is to require a new, separate wallet to be created, and the contents of the digital wallet must be transferred. In current systems, the wallet itself remains with the blockchain and can become "dead" in that it exists with no contents. Thus, in current systems, the user does not own their wallet, but instead relies on the blockchain interface to provide the secure storage of their assets. Often in these scenarios, the creation of a new wallet and the transfer of the assets thereto incur additional fees. Thus, the user must pay to keep ownership of their purchased assets (e.g. NFTs) if they wish to exit the blockchain.

In the presently described processes, according to one example, a user controls his/her own wallet and may freely exit the chain at any point. Upon exit, the wallet and the assets contained therein remain with the user. The keys, which were split between the minter, the wallet, and the blockchain interface program, can be consolidated and downloaded, or transferred to another service or application, as desired. The wallet, while memorialized on the original minting blockchain, becomes transferable with the assets and may be converted to a cold wallet or may be moved to a new blockchain. The records on the original blockchain become "dead."

According to another aspect, the present processes may further facilitate the easy and efficient exchange, gifting, or transfer of NFTs and other blockchain based/tracked assets in the ability to link minted NFTs and other assets to a portable card. For example, it is common to purchase a gift card for a restaurant or retailer through a third party, such as at a grocery store, convenience store, or big box retailer. These gift cards are activated upon purchase and are redeemable for goods and services based on the type of card chosen and activated. The present processes may be utilized to allow similar gift card type purchases of blockchain assets, including NFTs, cryptocurrency, or other similar blockchain based assets. According to this example, a person could purchase a gift card with a specified amount. Upon activation, the person could scan a UPC, QR code, or the like pre-printed on the card which may prompt them to download and activate an account on the blockchain interface application/program. As soon as an account is activated, the care may be funded, the two- or three-part security keys may be generated, and the appropriate asset may be transferred. Much like a gift card, the purchaser may buy the card for their own benefit, or may gift the card to another and allow them the benefits of activation. The gift card represents a tangible means to transfer the underlying digital assets while providing the human experience of giving and receiving a tangible item.

In accordance with these exemplary implementations, the disclosed processes may be implemented to create an online platform to provide access to tangible collectable items, including memorabilia, antiques, or the like, that likewise creates a verifiable digital chain of title upon the sale of an item. In doing so, online buyers may view detailed information about an item for sale, including photo, videos, 3D images, or the like. Other information may be provided, including appraisal information, authenticity certificates or the like.

Upon a purchase, a request may be sent to automatically create a certified digital deed, which may be minted to the blockchain. Simultaneously, one or more NFTs representing the digital images, authentication, and/or appraisal information may be minted to the blockchain and added to the digital wallet of the purchaser in accordance with the processes provided herein. The physical item may likewise be shipped directly to the purchaser. Alternatively, the physical item may be held in escrow on behalf of the purchaser and a new NFT may be minted outlining the location and terms of the storage of the item.

Subsequent transfers of the item may be further facilitated by utilizing the blockchain and online platform to list the item for subsequent sale. Once sold, an identical process may be initiated wherein new NFTs with the new title information, item information, and the like may be transfer to the new owner and removed from the wallet of the seller.

The processes and systems described herein may be implemented into real world application as part of a comprehensive and secure ownership and transactional environment. This may include an enhanced user experience for minting new NFTs to a blockchain, buying, and/or selling NFTs and underlying assets. An exemplary buying and selling experience, according to one aspect of this disclosure, will now be described. It will be understood that this is a single, non-limiting, example of how the processes and systems described herein may be implemented into a real-world experience. Other implementations may be contemplated or enacted by a person of skill while remaining within the scope of the disclosure provided herein.

Thus, according to this example, it is envisioned that a native smart device application (the "application") may be created or used to provide the user interface with the processes described herein. It is expected that such an application would allow an end user to access their account, their own digital wallet, and engage in new purchasing and selling transactions. Likewise, this application would be expected to retain a history of prior transactions.

As discussed herein, these processes may then be initiated by the desire of a user to sell an item of value. For simplicity in the disclosure, the item is referred to in this example as a collectible. The systems and processes described herein may be utilized to transfer ownership from a first person (seller) to a second person (buyer) as follows. The seller may create an account on the application which may prompt several processes, including processes 10 to create a new seller's wallet, process 100 to activate the seller's wallet, including the creation and distribution of multiple encrypted wallet parts A, B, and optionally C.

In addition to creating the account, the seller may upload one or more images of the collectable. Each uploaded image may prompt the creation of an NFT, as described in process 600 herein. The seller may also upload data about the item, including appraisal data, certificates of authenticity, location data, and the like. Each additional item added to the sales listing may prompt an addition NFT creation action to the microservices server 602. Once the actions are verified and any necessary listing fee or listing payment is received, the NFTs may be minted directly onto the blockchain, with one new NFT for each specific item provided by the seller.

Once all of the appropriately related NFTs are minted, they may be transferred to the seller's wallet, or to a "house wallet" hosted by the application server. From there, the listing may be made live in a marketplace environment where buyers may view the listing and the various NFTs associated therewith. Once a buyer decides to purchase the collectable, they may create their own buyer's account, which again prompts the creation of a buyer's wallet with its own separate wallet parts, etc. Upon payment of the agreed purchase price, the application and system may immediately generate an NFT creation request to mint a new TRV NFT containing all of the token identifiers of each NFT relating to the collectable, the public address of the program "house" wallet, and a timestamp verifying the time and date of the transaction (process 600 at 622). The application may also mint an NFT as a digital sales deed showing the transfer of ownership from the seller to the buyer. This deed, along with each of the NFTs and the TRV NFT may be transferred to the buyer's wallet upon completion of the sales transaction.

The collectable may then be shipped to the buyer according to the agreed upon handling of the sale. Alternatively, the collectable may be stored with a third-party. Any physical transfer of the tangible collectable may be documented on the blockchain through the further minting of new NFTs in the chain, which may be preserved in the appropriate wallets. Each NFT, TRV, and bit of information is immutably stored on the blockchain and backed up in the application's house wallet which provides redundancy should any information be corrupted or lost. This can result in a straightforward way of establishing and retaining identity, as well as asset ownership.

Future sales of the collectable may be handled in a similar fashion, except that the buyer's records from the original purchase will remain with the item through its connection to the blockchain. Thus, subsequent purchasers can verify the chain of title, possession, condition, value, and all digital records nearly instantaneously from anywhere in the world with suitable internet connectivity.

The processes and system described herein represent improved efficiency, speed, lower cost, security, and verifiability over existing NFT and blockchain transactions. Further, they represent vast improvement over existing marketplace transactions, both online and in person, which rely on word-of-mouth and trustability between the parties to the transaction for things such as authenticity, value, and chain of title. Put another way, a person to person sale of a collectable normally requires the buyer to trust they seller that the item is in fact authentic and came from the source the buyer says. The distributed ledger technology of the blockchain coupled with the TRV NFTs of the present system are immutable and verifiable, allowing immediate access to the entire history of the transactions relating to the collectable. Thus, a buyer is assured of the authenticity, and the seller benefits by easily being able to back up the value of the item.

Should a buyer or seller wish to exit the application and remove themselves from the marketplace, the processes herein provide that they may do so while retaining ownership of their entire wallet and its contents. Current systems do not allow for this, instead requiring the user exiting to create a new wallet elsewhere before enacting a transfer of the contents of their current wallet to the new wallet. As provided herein, particularly in process 200, a user may exit at any time, and provided they can authenticate their identity, they may download the entirety of their wallet and move on will full ownership of the wallet and its contents. How this relates to the above example is that an owner of an asset may leave the provided system at any time, but may retain the digital records and digital assets with full control and ownership, along with any appreciated value associated therewith.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A method of using a cryptocurrency gift card comprising:
   purchasing a cryptocurrency gift card with a specified value at a retail point of purchase;
   downloading a native application to an associated smart device;
   activating the gift card via the native application;
   creating at least one non-fungible token (NFT) in response to activating the gift card;
   creating a digital wallet;
   linking the digital wallet to the gift card;
   transferring the at least one NFT to the digital wallet;
   generating at least one encrypted wallet key, wherein generating the at least one encrypted wallet key further comprises:
      dividing the at least one encrypted wallet key into a first part, a second part, and a third part;
      encrypting the first part of the at least one encrypted wallet key with a first cipher; and
      encrypting the second part and the third part of the at least one encrypted wallet key with a second cipher;
   storing the first part of the at least one encrypted wallet key in a minter database;
   transferring the second part of the at least one encrypted wallet key to the digital wallet linked to the gift card; and
   storing the third part of the at least one encrypted wallet key in the native application.

2. The method of claim 1 wherein the first cipher further comprises an activation programming interface (API) cipher.

3. The method of claim 1 wherein the second cipher further comprises a server cipher.

4. The method of claim 1 wherein creating the at least one NFT further comprises:
   linking at least one digital file to the native application; and
   creating the at least one NFT containing the at least one digital file linked to the native application.

5. The method of claim 4 further comprising:
   linking a first digital file to the native application;
   linking a second digital file to the native application;
   creating a first NFT containing the first linked digital file;
   creating a second NFT containing the second linked digital file; and
   transferring the first and second NFTs to the digital wallet.

6. The method of claim 5 wherein the first digital file further comprises an image of a tangible item.

7. The method of claim 6 wherein the first digital file further comprises one of a photograph, video, 3D image, and a drawing.

8. The method of claim 6 wherein the second digital file further comprises a digital deed to a tangible item.

9. The method of claim 8 wherein transferring the second NFT to the digital wallet further comprises:
   transferring the deed to the tangible item; and
   transferring ownership of tangible item along with the deed.

10. The method of claim 9 further comprising transferring physical possession of the gift card to effectively transfer ownership of the digital wallet, the first NFT, the second NFT, and the ownership of the tangible item.

* * * * *